United States Patent
Carlson et al.

(10) Patent No.: US 7,925,916 B2
(45) Date of Patent: Apr. 12, 2011

(54) FAILSAFE RECOVERY FACILITY IN A COORDINATED TIMING NETWORK

(75) Inventors: Scott M. Carlson, Tucson, AZ (US);
Donald Crabtree, Port Ewen, NY (US);
Dennis J. Dahlen, Rhinebeck, NY (US);
Denise M. Sevigny, Wappingers Falls, NY (US); Judith A. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/100,660

(22) Filed: Apr. 10, 2008

(65) Prior Publication Data

US 2009/0259881 A1 Oct. 15, 2009

(51) Int. Cl.
*G06F 11/00* (2006.01)
(52) U.S. Cl. .................................................. 714/4
(58) Field of Classification Search .............. 714/1–4, 714/11–13, 15, 16, 18–21, 31, 37, 39, 43, 714/47, 48, 56

See application file for complete search history.

(56) References Cited

U.S. PATENT DOCUMENTS

| | | | |
|---|---|---|---|
| 4,894,846 A | 1/1990 | Fine | |
| 5,481,258 A | 1/1996 | Fawcett et al. | |
| 5,602,992 A | 2/1997 | Danneels | |
| 5,689,688 A | 11/1997 | Strong et al. | |
| 5,784,421 A | 7/1998 | Dolev et al. | |
| 5,812,749 A | 9/1998 | Fernandez et al. | |
| 5,848,028 A | 12/1998 | Burklin | |
| 5,925,107 A | 7/1999 | Bartfai et al. | |
| 5,968,133 A * | 10/1999 | Latham et al. | 709/248 |
| 6,173,023 B1 | 1/2001 | Tanonaka et al. | |
| 6,253,335 B1 * | 6/2001 | Nakajima et al. | 714/15 |
| 6,351,821 B1 | 2/2002 | Voth | |
| 6,535,491 B2 | 3/2003 | Gai et al. | |
| 6,606,362 B1 | 8/2003 | Daizell et al. | |
| 6,636,987 B1 | 10/2003 | Ruffini | |
| 6,697,382 B1 | 2/2004 | Eatherton | |
| 6,704,801 B1 | 3/2004 | Minyard | |
| 6,714,563 B1 | 3/2004 | Kushi | |
| 6,742,044 B1 | 5/2004 | Aviani et al. | |
| 6,748,451 B2 | 6/2004 | Woods et al. | |
| 6,754,171 B1 | 6/2004 | Bernier et al. | |

(Continued)

FOREIGN PATENT DOCUMENTS

| | | |
|---|---|---|
| WO | 01/95550 A2 | 12/2001 |
| WO | 02/44877 A1 | 6/2002 |
| WO | 03/036395 A1 | 5/2003 |

OTHER PUBLICATIONS

Office Action for U.S. Appl. No. 12/541,485 dated Oct. 12, 2010.

(Continued)

*Primary Examiner* — Nadeem Iqbal
(74) *Attorney, Agent, or Firm* — John E. Campbell; Blanche E. Schiller, Esq.; Heslin Rothenberg Farley & Mesiti P.C.

(57) ABSTRACT

A failsafe recovery capability for a Coordinated Timing Network. The recovery capability facilitates recovery when communication is lost between two servers of the coordinated timing network. The capability includes checking another system's status in order to determine what action is to be taken. The status includes the stratum level of the servers and a version number indicating the code level of the servers.

20 Claims, 13 Drawing Sheets

U.S. PATENT DOCUMENTS

| | | | |
|---|---|---|---|
| 6,760,316 | B1 | 7/2004 | Hebsgaard et al. |
| 6,768,452 | B2 | 7/2004 | Gilkes |
| 6,819,682 | B1 | 11/2004 | Rabenko et al. |
| 6,895,189 | B1 * | 5/2005 | Bedrosian ............... 398/155 |
| 7,139,346 | B2 | 11/2006 | Skahan, Jr. et al. |
| 7,146,504 | B2 | 12/2006 | Parks et al. |
| 7,185,111 | B2 | 2/2007 | Fulghum et al. |
| 7,283,568 | B2 * | 10/2007 | Robie et al. ............... 370/503 |
| 7,356,725 | B2 | 4/2008 | Engler |
| 7,394,802 | B2 | 7/2008 | Jun et al. |
| 7,395,448 | B2 | 7/2008 | Smith |
| 7,454,648 | B2 | 11/2008 | Dahlen |
| 7,475,272 | B2 | 1/2009 | Carlson |
| 7,496,606 | B2 | 2/2009 | Hind et al. |
| 7,535,931 | B1 * | 5/2009 | Zampetti et al. ............ 370/508 |
| 7,539,777 | B1 * | 5/2009 | Aitken ................... 709/248 |
| 7,571,268 | B2 | 8/2009 | Kern et al. |
| 7,617,410 | B2 | 11/2009 | Check et al. |
| 7,688,865 | B2 | 3/2010 | Carlson et al. |
| 7,689,718 | B2 | 3/2010 | Carlson et al. |
| 2002/0027886 | A1 | 3/2002 | Fischer et al. |
| 2002/0039370 | A1 | 4/2002 | Elliot |
| 2002/0073228 | A1 | 6/2002 | Cognet |
| 2002/0078243 | A1 | 6/2002 | Rich et al. |
| 2002/0131370 | A1 | 9/2002 | Chuah et al. |
| 2002/0131398 | A1 | 9/2002 | Taylor |
| 2003/0035444 | A1 | 2/2003 | Zwack |
| 2003/0048811 | A1 * | 3/2003 | Robie et al. ............... 370/509 |
| 2003/0152177 | A1 | 8/2003 | Cahill-O'Brien |
| 2003/0235216 | A1 | 12/2003 | Gustin |
| 2004/0073718 | A1 | 4/2004 | Johannessen et al. |
| 2004/0076187 | A1 | 4/2004 | Peled |
| 2004/0125822 | A1 | 7/2004 | Jun et al. |
| 2004/0167990 | A1 | 8/2004 | Peer |
| 2005/0020275 | A1 | 1/2005 | Agrawala et al. |
| 2005/0033862 | A1 | 2/2005 | Blum |
| 2005/0135429 | A1 | 6/2005 | Bingham et al. |
| 2005/0169233 | A1 | 8/2005 | Kandala et al. |
| 2007/0058491 | A1 | 3/2007 | Dahlen et al. |
| 2007/0086489 | A1 | 4/2007 | Carlson |
| 2008/0028254 | A1 | 1/2008 | Smith |
| 2008/0059655 | A1 | 3/2008 | Carlson |
| 2008/0059808 | A1 | 3/2008 | Engler |
| 2008/0072096 | A1 | 3/2008 | Smith |
| 2008/0072097 | A1 | 3/2008 | Check |
| 2008/0162984 | A1 | 7/2008 | Kalra et al. |
| 2008/0183849 | A1 | 7/2008 | Carlson |
| 2008/0183877 | A1 | 7/2008 | Carlson |
| 2008/0183895 | A1 * | 7/2008 | Carlson et al. ............ 709/248 |
| 2008/0183896 | A1 | 7/2008 | Carlson |
| 2008/0183897 | A1 * | 7/2008 | Carlson et al. ............ 709/248 |
| 2008/0183898 | A1 | 7/2008 | Carlson |
| 2008/0183899 | A1 * | 7/2008 | Carlson et al. ............ 709/248 |
| 2008/0184060 | A1 | 7/2008 | Carlson |
| 2008/0225897 | A1 * | 9/2008 | Bryant et al. ............... 370/503 |
| 2009/0070618 | A1 | 3/2009 | Dahlen et al. |
| 2009/0257456 | A1 | 10/2009 | Carlson et al. |
| 2010/0049818 | A1 | 2/2010 | Walker |
| 2010/0100761 | A1 | 4/2010 | Carlson et al. |
| 2010/0100762 | A1 | 4/2010 | Carlson et al. |

OTHER PUBLICATIONS

J. Burbank et al., "The Network Time Protocol Version 4 Protocol Specification; draft-ietf-ntp-ntpv4-proto-02.txt", IETF Standard-Working-Draft, Internet Engineering Task Force, IETF, CH, vol. ntp, No. 2, Mar. 2006, XP015045008, ISSN: 0000-0004.

L.S. Liang, "Time Server In Advanced Automation Local Area Network", Computer Standards and Interfaces, Elsevier Sequoia, Lausanne,CH, vol. 6, No. 3, Jan. 1989,pp. 223-227, XP000112504, ISSN: 0920-5489.

Kadoch, Michel, "ATM Signalling: A Tutorial," Canadian Conference on Electrical and Computer Engineering—Congres Canadien En Genie Electrique Et Informatique, vol. 1, Sep. 5, 1995; pp. 420-423, XP000618815; p. 421-p. 422.

Sun, Kun et al., "Fault-Tolerant Cluster-Wise Clock Synchronization for Wireless Sensor Networks," Jul.-Sep. 2005, IEEE Transactions on Dependable and Secure Computing, vol. 2, No. 3, pp. 177-189.

"Z/Architecture Principles of Operation," IBM Publication No. SA22-7832-04, Fifth Edition, Sep. 2005.

"Z/Architecture Principles of Operation," IBM Publication No. SA22-7832-05, Sixth Edition, Apr. 2007.

"Z/Architecture Principles of Operation," IBM Publication No. SA22-7832-06, Seventh Edition, Feb. 2008.

International Search Report and Written Opinion for PCT/EP2007/058910 dated Nov. 6, 2007.

International Search Report and Written Opinion for PCT/EP2008/050482 dated Apr. 24, 2008.

International Search Report and Written Opinion for PCT/EP2008/050524 dated May 27, 2008.

International Search Report and Written Opinion for PCT/EP2008/050620 dated May 13, 2008.

International Search Report and Written Opinion for PCT/EP2008/050726 dated Aug. 1, 2008.

International Search Report and Written Opinion for PCT/EP2008/050739 dated Sep. 11, 2008.

Office Action for U.S. Appl. No. 11/468,352 dated Dec. 18, 2008.

Office Action for U.S. Appl. No. 11/468,352 dated Jun. 1, 2009.

Final Office Action for U.S. Appl. No. 11/468,352 dated Oct. 27, 2009.

Office Action for U.S. Appl. No. 11/468,352 dated Apr. 21, 2010.

Office Action for U.S. Appl. No. 11/876,152 dated Oct. 15 2009.

Office Action for U.S. Appl. No. 11/876,199 dated Oct. 26, 2009.

Office Action for U.S. Appl. No. 11/876,240 dated Oct. 26, 2009.

Final Office Action for U.S. Appl. No. 11/876,240 dated Mar. 19, 2010.

Office Action for U.S. Appl. No. 11/876,272 dated Oct. 16, 2009.

Office Action for U.S. Appl. No. 11/940,518 dated Oct. 15, 2009.

Final Office Action for U.S. Appl. No. 11/940,518 dated Apr. 2, 2010.

Office Action for U.S. Appl. No. 11/940,558 dated Sep. 3, 2009.

Office Action for U.S. Appl. No. 12/100,872 dated May 28, 2010.

U.S. Appl. No. 12/748,539 entitled "Channel Subsystem Server Time Protocol Commands," Carlson et al., filed Mar. 29, 2010.

U.S. Appl. No. 12/782,144 entitled "Server Time Protocol Control Messages and Methods," Carlson et al., filed May 18, 2010.

Office Action for U.S. Appl. No. 12/792,144 dated Nov. 17, 2010.

Office Action for U.S. Appl. No. 12/100,872 dated Nov. 17, 2010.

Neville, Iain, "IBM System Z Technical Conference," Apr. 2007, IBM Corporation.

Dhondy, Noshir, "Introduction to Server Time Protocol with IBM System and Technology Group," Oct. 9-13, 2006.

"Server Time Protocol for IBM Z9 System, zSeries 990 and 890; Non-Raised-Floor Support for System z9 BC," Oct. 2006.

* cited by examiner

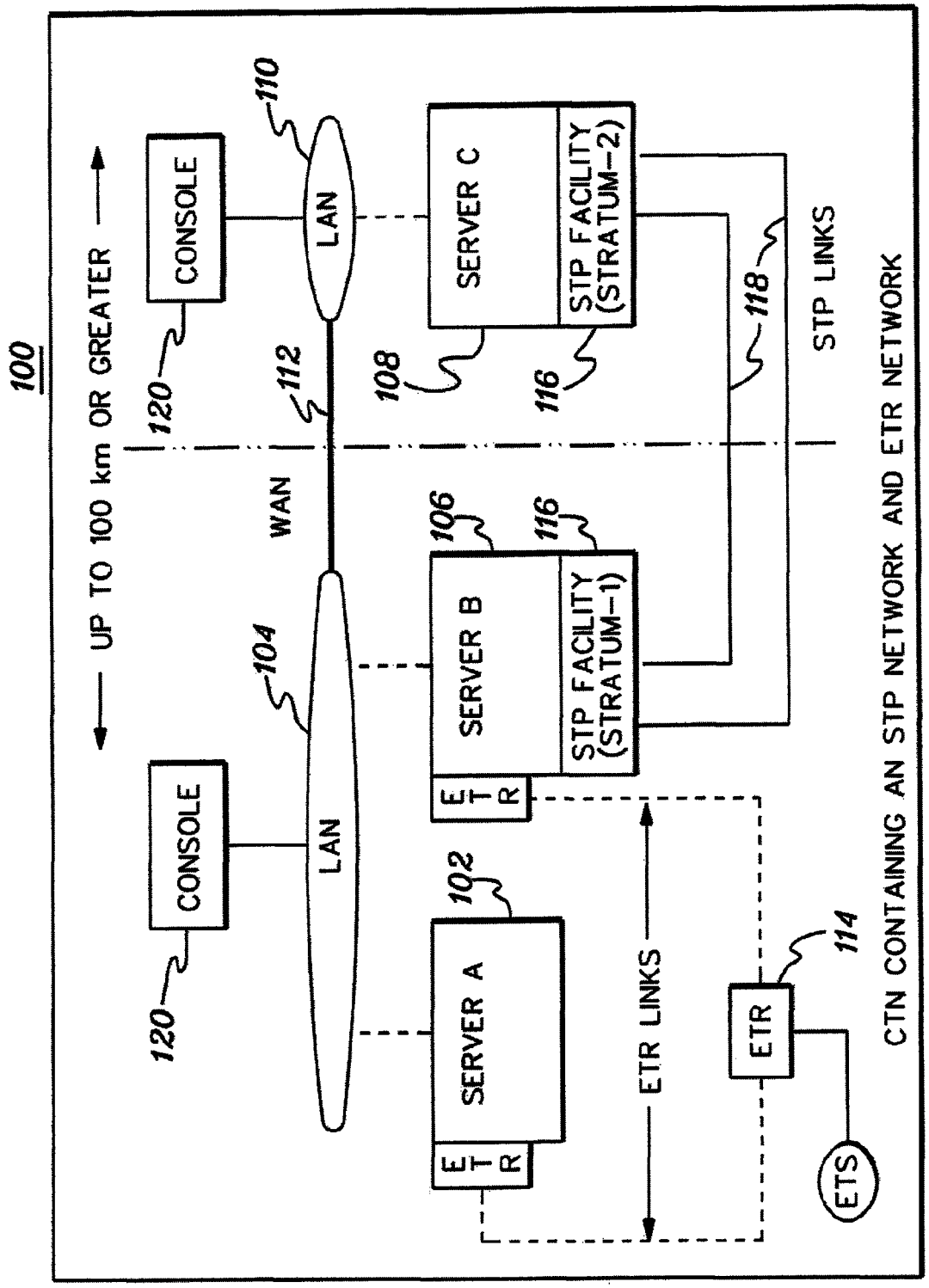
FIG. 1A  CTN CONTAINING AN STP NETWORK AND ETR NETWORK

US 7,925,916 B2

FAILSAFE RECOVERY FACILITY IN A COORDINATED TIMING NETWORK

TECHNICAL FIELD

This invention relates, in general, to time synchronization within and across a network of processing units, and in particular, to providing a failsafe recovery facility to be used in such an environment.

BACKGROUND OF THE INVENTION

For performance and data integrity, computing systems that access shared data, such as a Sysplex offered by International Business Machines Corporation, Armonk, N.Y., must be able to maintain time of day (TOD) clock synchronization to an accuracy that is better than best case communication time between the systems. Currently, in one example, to meet the synchronization requirements, a timer, such as the IBM® Sysplex Timer®, is used. This timer requires expensive dedicated timing links and a separate external box. IBM® and Sysplex Timer® are registered trademarks of International Business Machines Corporation, Armonk, N.Y.

Networks, such as the Network Timing Protocol (NTP), provide time synchronization, but do not meet the accuracy requirements of high-end systems. NTP requires that each server has access to an external time source that provides accuracy to a microsecond level in order to ensure all servers synchronize to the same reference time. This is a problem for those systems that do not have a capability to attach to external time servers that provide this level of accuracy. Further, a requirement of GPS receivers or similar attachment on each system may be considered infeasible for maintenance, security and reliability reasons.

SUMMARY OF THE INVENTION

To address the deficiencies of the above facilities, a Coordinated Timing Network (CTN) is provided. In such a network, an active stratum-1 server is used to ensure the other servers in the network use the same primary reference time to synchronize their clocks.

Due to the importance of the active stratum-1 server, procedures are needed to handle a failure of the active stratum-1 server. One example of a procedure is described in U.S. Ser. No. 11/876,152, entitled "Facilitating Synchronization of Servers in a Coordinated Timing Network," filed Oct. 22, 2007, which is hereby incorporated herein by reference in its entirety. The procedure described therein assists in determining when an alternate server of the network can take over the role of the active stratum-1 server. Although such a procedure is provided, further enhancements are needed.

For example, a need exists for a recovery procedure that is failsafe. As one example, a need exists for a recovery procedure that is invoked when both the active stratum-1 server and the alternate server lose time synchronization. As a further example, a need exists for a recovery procedure that addresses when both the primary stratum-1 server and the alternate server decide to play the role of the active stratum-1 server after coupling communication has been lost between the servers.

The shortcomings of the prior art are overcome and additional advantages are provided through the provision of an article of manufacture that includes at least one computer usable medium having computer readable program code logic to facilitate recovery in a timing network. The computer readable program code logic when executing performing, for instance, detecting, by one server of the timing network, a situation in the timing network for which corrective action is to be taken, the situation excluding a failure of the one server and another server of the timing network coupled to the one server; obtaining, in response to the detecting, status information of the another server of the timing network, the status information including a stratum level of the another server and a level of capability of the another server; and selecting a corrective action to be taken, the selecting being based on the situation, the obtained status information, and the stratum level and level of capability of the one server.

Systems and methods relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1A depicts one example of a mixed coordinated timing network to incorporate one or more aspects of the present invention;

DETAILED DESCRIPTION OF THE INVENTION

Figure 1B:
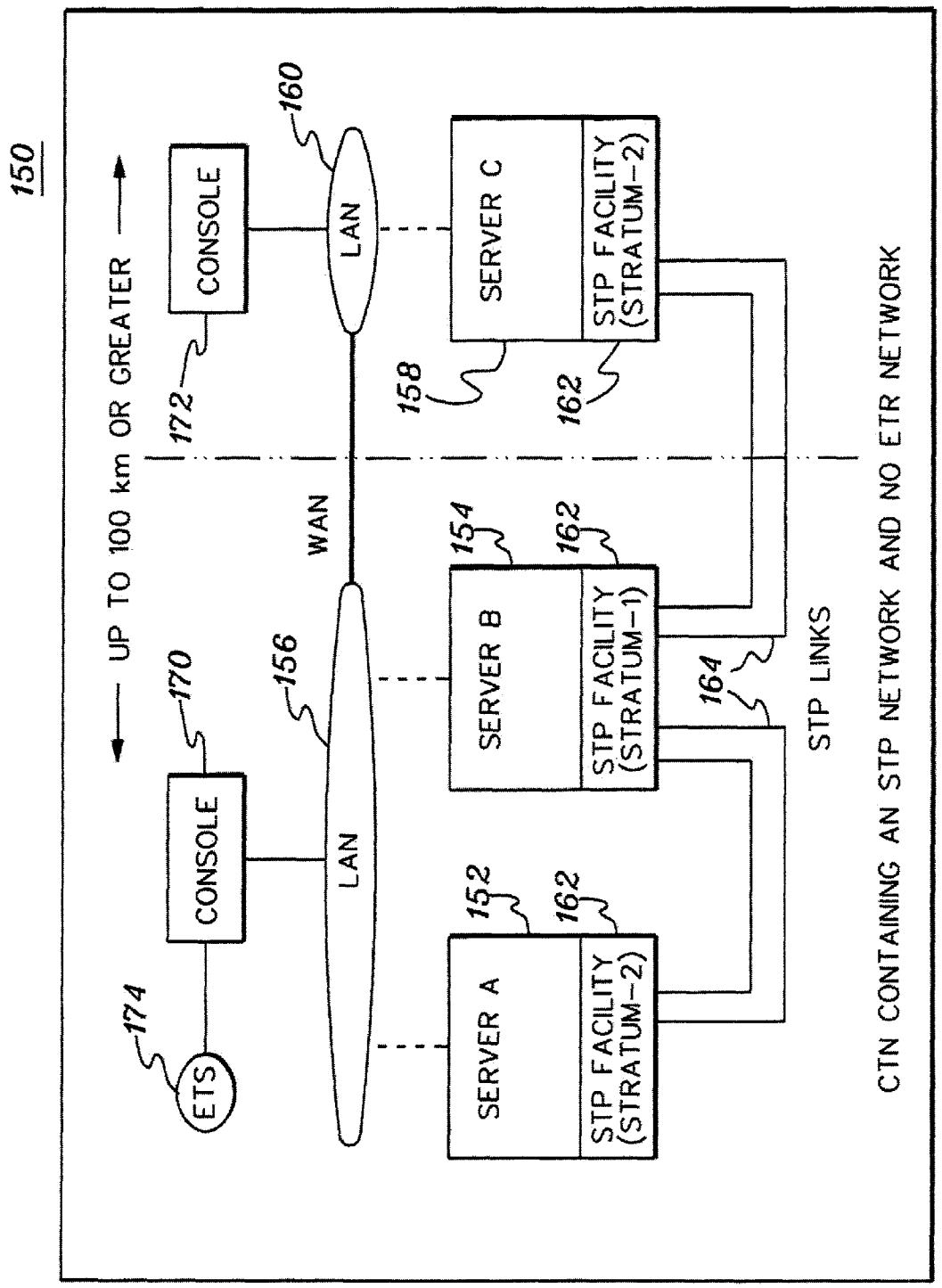
FIG. 1B depicts one example of an STP-only network to incorporate one or more aspects of the present invention.

In accordance with an aspect of the present invention, a failsafe recovery capability is provided. In one example, the recovery capability facilitates recovery when communication is lost between two servers (e.g., an active stratum-1 server of a Coordinated Timing Network (CTN) and an alternate server), but neither server has actually failed. For instance, recovery is facilitated when the active stratum-1 server and the alternate server both lose time synchronization causing the entire CTN to lose time synchronization. As a further example, recovery is facilitated when both the alternate server and the primary stratum-1 server decide to play the role of the active stratum-1 within a single CTN after coupling communication has been lost between the servers. When this occurs, a data integrity situation can result since two systems are independently claiming to be the single source of time.

As one example, the failsafe capability includes checking another system's status, in response to a detected situation. The status, which includes, for instance, stratum level and version numbers of the server being checked, as well as the checking server, is used to detect a recovery scenario and to take corrective action. In a further example, the status also includes a Coordinated Timing Network (CTN) id used to ensure the correct server is being checked (i.e., the one in the same network as the server performing the check).

One environment including one or more aspects of the present invention is a Coordinated Timing Network (CTN). In a Coordinated Timing Network, multiple distinct computing systems maintain time synchronization to form the Coordinated Timing Network. Systems in the Coordinated Timing Network employ a message based protocol, referred to as a Server Time Protocol (STP), to pass timekeeping information between the systems over existing, high-speed data links. This enables the time of day (TOD) clocks at each system to be synchronized to the accuracy required in today's high-end computing systems. Since the protocol makes use of technology within a computing system, synchronization accuracy scales as technology improves. A computing system that provides an STP facility is referred to as a time server or server herein.

A server defined in a CTN as an active time server provides primary reference time for the CTN. The server in a CTN that determines CST (an estimate of the time-of-day (TOD) clock for the CTN) based on information from another server in the CTN is referred to as the secondary time server. The active time server may obtain its time from an external time source, which provides the means to synchronize the time of day clocks in a CTN to a defined time standard.

Servers in a CTN that are in the synchronized state are assigned a value, referred to as a stratum level, that indicates the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases. The server that is unsynchronized is assigned a stratum level of 0.

The STP facility provides the procedures required to transmit, receive and process STP messages. STP messages are transmitted over one or more data links between servers. The data link that has been established between two servers is referred to as an STP path. The STP facility provides the facilities to establish and maintain STP paths.

STP messages include a message command and a message response. Two types of STP messages are supported. The exchange time parameters (XTP) message and the STP control (STC) message. The XTP message is used to exchange the timekeeping information used to determine CST for the CTN. STP control messages are used to set and modify various CTN parameters required by servers in the CTN.

A CTN can operate, for instance, as one of two types of configurations: either as a mixed CTN configuration or as an STP-only CTN configuration. In a mixed CTN configuration, the servers are configured to be part of both an STP network and an External Time Reference (ETR) network. In a mixed CTN configuration, the servers in the CTN are configured with the same, non-null ETR network ID and a timer (e.g., IBM® Sysplex Timer®) provides the primary time reference for the CTN. At least one server in the CTN is to step to timing signals provided by the Sysplex Timer® before synchronization can occur within the CTN. Servers not stepping to the Sysplex Timer® are secondary time servers and achieve synchronization by exchanging STP signals.

As one example, each server stepping to the timing signals of the Sysplex Timer® receives the time protocol parameters and propagates the information to secondary time servers in the CTN, using, for instance, a CTN parameter update procedure. One example of this procedure is described in U.S. Ser. No. 11/468,352, entitled "Coordinated Timing Network Configuration Parameter Update Procedure," Carlson et al., filed Aug. 30, 2006, which is hereby incorporated herein by reference in its entirety.

One example of a mixed CTN configuration 100 is described with reference to FIG. 1A. Mixed CTN configuration 100 includes, for instance, a Server A (102) coupled to a local area network (104), a Server B (106) coupled to local area network (104) and a Server C (108) coupled to a local area network (110). Each server is, for instance, a central processing complex based on the z/Architecture® offered by International Business Machines Corporation. z/Architecture® is a registered trademark of International Business Machines Corporation, Armonk, N.Y., USA. One embodiment of the z/Architecture® is described in "z/Architecture Principles of Operation," IBM Publication No. SA22-7832-05, April 2007, which is hereby incorporated herein by reference in its entirety.

Each local area network is coupled to a console 120 allowing the servers to communicate with one another via a console path. Further, local area network 104 and local area network 110 are coupled to one another via a wide area network 112.

Servers A and B are coupled to an external time reference network 114, and Servers B and C are configured to be part of an STP network 116. Server B is at a stratum-1 level and Server C is at a stratum-2 level. STP links 118 are used to couple the STP facility of Server B with the STP facility of Server C.

In an STP-only CTN, the servers in the CTN are configured to be part of an STP network and none are configured to be part of an ETR network. One example of an STP-only network 150 is described with reference to FIG. 1B. In this example, Server A (152) and Server B (154) are coupled to a LAN (156), and Server C (158) is coupled to a LAN (160). Each of the servers includes an STP facility 162, and each facility is coupled to one another via one or more STP links 164.

Further, LAN 156 is coupled to a console 170 and LAN 160 is coupled to a console 172. Console 170 is further coupled to an external time source (ETS) 174, such as a dial out to a telephone time server (e.g., ACTS: NIST Automated Computer Time Service). In this network, there is no ETR network. Server B has a stratum level of 1, and Servers A and C have a stratum level of 2.

The server that is to act as the active stratum-1 server in the network, such as an STP-only network, is specified as part of a stratum-1 configuration defined for the network. The stratum-1 configuration is maintained at each server of the network and provides information relating to the configuration of the network, including, for instance, the type of configuration defined for the network. The network can be configured as one of various types, including, for instance:

a) Null Configuration—In a null configuration, a stratum-1 server is not identified. The server remains unsynchronized until it attaches to a server that has a non-null stratum-1 configuration. The stratum-1 configuration at a server that is at stratum level 0 is equal to the null configuration when, for instance, it is not attached to any other server and the single CEC-CTN indicator in a stratum-1 configuration information block, described below, is zero.

b) Single Server Definition—In a single server definition, the stratum-1 configuration defines a single primary stratum-1 server that acts as the active stratum-1 server for the CTN. The loss of the primary stratum-1 server results in the loss of synchronized time in the CTN until a new stratum-1 configuration is specified from the console.

A single server stratum-1 configuration may also include an indication that the specified stratum-1 server is the only server (e.g., central electronic complex (CEC) or central processing complex (CPC)) in the CTN and that no other or additional servers will be part of the CTN. In this case, the CTN is referred to as a single CEC CTN. When a stratum-1 configuration indicates that it is a single CEC CTN, the configuration is a valid stratum-1 configuration for the initialized state of the server following a power on reset. When a single server stratum-1 configuration does not specify that it is a single CEC CTN, the configuration is not a valid stratum-1 configuration for the initialized state of the server following a power on reset and the stratum-1 configuration is set to the null configuration.

c) Dual Server Configuration—In a dual server configuration, the configuration includes a primary stratum-1 server and an alternate stratum-1 server. The use of a dual server configuration provides a mechanism for an alternate server to be able to take over the role of active stratum-1 server for the CTN. The alternate stratum-1 server can take over as the active stratum-1 without disruption to the synchronization capability of the CTN. The stratum-1 server (primary or alternate) that is acting as the active stratum-1 server for a CTN is indicated in the stratum-1 configuration information block maintained at each server in the CTN, as described below. The stratum-1 server that is not the active stratum-1 server is defined as the inactive stratum-1 server.

The inactive stratum-1 server in a dual server configuration takes over the role of the active stratum-1 server when it detects an active stratum-1 failure. An active stratum-1 failure is detected in a dual server configuration when one of the following occurs:
  A stratum-1 system check signal is recognized, or
  A console assisted recovery procedure is performed and indicates that an active stratum-1 failure has occurred.
The inactive stratum-1 server in a dual server configuration may perform the console assisted recovery when, for instance, the inactive stratum-1 server loses attachment to the active stratum-1 server.

d) Triad Configuration—In a triad configuration, the stratum-1 configuration includes a primary stratum-1 server, an alternate stratum-1 server, and an arbiter server. The definition of a triad configuration provides a mechanism for an alternate server to be able to take over the role of active stratum-1 server for the CTN, as defined for a dual server configuration. Additionally, the definition of an arbiter server, when configured with connectivity to both the primary stratum-1 and alternate stratum-1 servers, provides a mechanism for the inactive stratum-1 and arbiter servers to communicate with each other to be able to determine that an active stratum-1 server failure has occurred and that the inactive stratum-1 should take over as the active stratum-1 server.
The inactive stratum-1 server in a triad configuration takes over the role of the active stratum-1 when it recognizes an active stratum-1 failure. The inactive stratum-1 server recognizes an active stratum-1 failure when any of the following occurs:
  A triad recovery procedure is performed and indicates that an active stratum-1 failure has occurred when both the inactive stratum-1 server and the arbiter agree that they both no longer have attachment to the active stratum-1 server.
  A console assisted recovery procedure is performed and indicates that an active stratum-1 failure has occurred.
The inactive stratum-1 server performs the triad recovery procedure when the following conditions occur:
  The inactive stratum-1 server loses attachment to the active stratum-1 server and has attachment to the arbiter.
  The inactive stratum-1 server recognizes an active stratum-1 communication timeout and has attachment to the arbiter.
The inactive stratum-1 server performs the console assisted recovery when, for instance, the inactive stratum-1 server loses attachment to the active stratum-1 server and is not attached to the arbiter.
The inactive stratum-1 server performs the active stratum-1 takeover procedure to take over the role of the active stratum-1 server for the CTN.
The active stratum-1 server in a triad configuration gives up the role of active stratum-1 server when it detects that it has lost attachment to both the inactive stratum-1 server and the arbiter server. The active stratum-1 server performs an active stratum-1 surrender procedure to give up the role of the active stratum-1 server for the CTN.

In one example, the stratum-1 configuration information is maintained in a control block, referred to as a stratum-1 configuration information block (SCIB), that is stored on or accessible to each server of the network. The SCIB is used to identify the stratum-1 configuration for a network.

Figure 2:
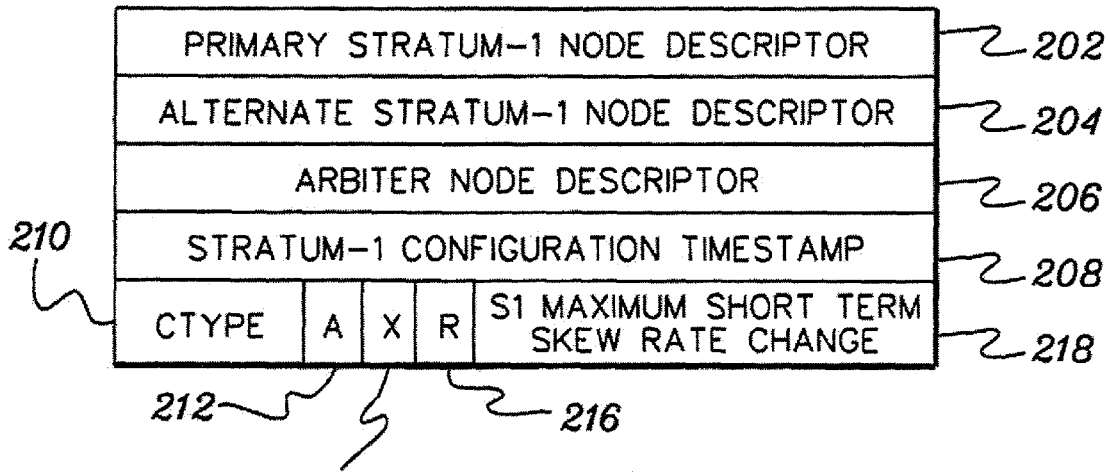
FIG. 2 depicts one example of a stratum-1 configuration information block, in accordance with an aspect of the present invention.

One embodiment of a stratum-1 configuration information block 200 is described with reference to FIG. 2. Stratum-1 configuration information block 200 includes, for instance, the following fields:

a) Primary Stratum-1 Node Descriptor 202: This field is valid when a single server, dual server or triad definition has been specified in the configuration type field of the configuration information block, described below, and when valid, includes the node descriptor of the primary stratum-1 node.

b) Alternate Stratum-1 Node Descriptor 204: This field is valid when a dual server or triad definition has been specified in the configuration type field, and when valid, includes the node descriptor of the alternate stratum-1 server node.

c) Arbiter Node Descriptor 206: This field is valid when a triad definition has been specified in the configuration type field and includes the node descriptor of the arbiter server node.

d) Stratum-1 Configuration Timestamp 208: This field includes a timestamp indicating the time at which the stratum-1 configuration information in this block became current at the server.

e) Configuration Type (CType) 210: This field specifies the type of stratum-1 configuration, as defined below:
  Null definition—None of the node descriptors are valid.
  Single server definition—Only the primary stratum-1 node descriptor is valid.
  Dual server definition—The primary stratum-1 and alternate stratum-1 node descriptors are valid.
  Triad definition—The primary stratum-1, alternate stratum-1 and arbiter node descriptors are valid.

f) Active Stratum-1 (A) 212: This field is valid when a dual server or triad definition has been specified and indicates whether the primary stratum-1 server or the alternate stratum-1 server is the active stratum-1 server.

g) Single CEC CTN (X) 214: This field is valid when the configuration type specifies a single server definition and when one, as an example, indicates the CTN is a single CEC CTN. When the field is, for instance, zero, the CTN is not a single CEC CTN.

h) Recovery Configuration (R) 216: This field indicates whether the stratum-1 configuration described by this block is the result of a stratum-1 recovery action or a console command.

i) Stratum-1 Maximum Short Term Skew Rate Change 218: This field includes a value that specifies the maximum possible change in the skew rate of the physical oscillator at the stratum-1 server that may occur over any specified period (e.g., 1 second).
  On machines that are not capable of performing dynamic oscillator switching, the value is equal to the maximum stratum-1 oscillator frequency drift that can occur over a specified period (e.g., 1 second). On machines that are capable of performing dynamic oscillator switching, the value is set to the maximum range of skew tolerance specified for the oscillator. For example, on a machine that supports dynamic oscillator switching with oscillator skew tolerance specified at +/−2 ppm to nominal frequency, the value is set to the equivalent of 4 ppm. A dynamic oscillator switch occurs when the physical oscillator used to drive the system TOD clock is switched from one oscillator to another.

In addition to the above control block, another control block, referred to as the new stratum-1 configuration information block (NSCIB), may be used to specify a new stratum-1 configuration for the CTN. Additionally, it may be used to specify an update to the CTN ID that is to occur concurrently with the stratum-1 configuration change.

In one example, the NSCIB at a server is meaningful when the server is configured to be part of an STP-only CTN configuration or if the STP-migration bit in the NSCIB is equal to one.

Figure 3:
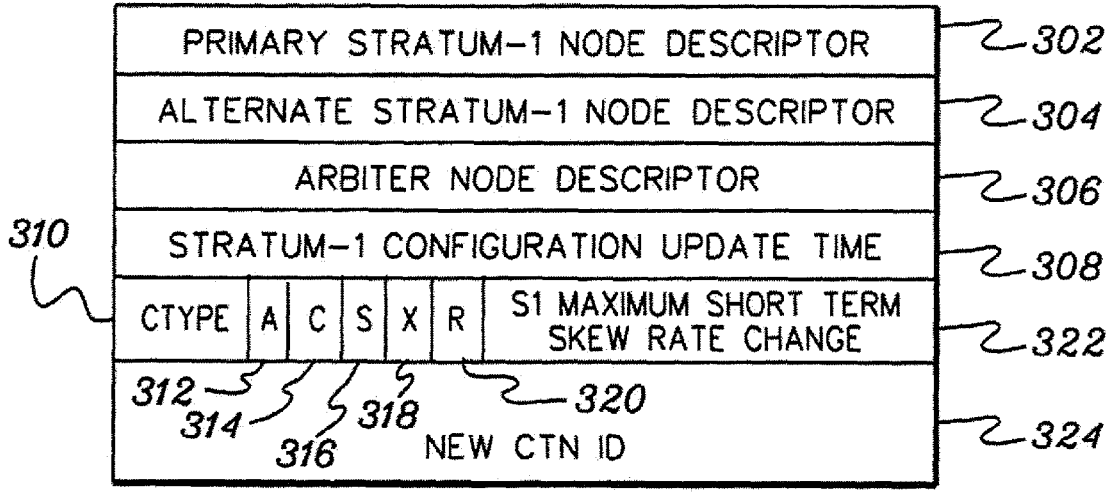
FIG. 3 depicts one example of a new stratum-1 configuration information block, in accordance with an aspect of the present invention.

One embodiment of a new stratum-1 configuration information block 300 is described with reference to FIG. 3. New stratum-1 configuration information block 300 includes, for instance, the following fields:

a) Primary Stratum-1 Node Descriptor 302: This field is valid when a single-server, dual server or triad definition has been specified in the configuration type field and includes the node descriptor of the new primary stratum-1 node.

b) Alternate Stratum-1 Node Descriptor 304: This field is valid when a dual server or triad definition has been specified in the configuration type field and includes the node descriptor of the new alternate stratum-1 node.

c) Arbiter Node Descriptor 306: This field is valid when a triad definition has been specified in the configuration type field and includes the node descriptor of the new arbiter node.

d) Stratum-1 Configuration Update Time 308: When the server is configured to be part of an STP-only CTN, this field includes a timestamp that indicates when the values in this block are to become current for the CTN.

e) Configuration Type (CType) 310: This field specifies the type of stratum-1 configuration as defined below:
  Null definition—None of the node descriptors are valid.
  Single server definition—Only the primary stratum-1 node descriptor is valid.
  Dual server definition—The primary stratum-1 and alternate stratum-1 node descriptors are valid.
  Triad definition—The primary stratum-1, alternate stratum-1 and arbiter node descriptors are valid.

f) Active Stratum-1 (A) 312: This field is valid when a dual server or triad definition has been specified and indicates whether the primary stratum-1 server or the alternate stratum-1 server is the active stratum-1 server.

g) CTN ID Change (C) 314: When the server is configured to be part of an STP-only CTN, this field indicates whether a CTN ID change is being requested and the CTN ID is valid. The change occurs at the stratum-1 configuration update time.
  The CTN ID is a value that is used to identify a CTN. The CTN ID includes, for instance, an STP network ID and an ETR network number. The STP network ID identifies the STP network, if any, that is configured for the server. The ETR network number identifies the ETR network number, if any, that is configured for this server.

h) STP Migration Configuration (S) 316: This field is meaningful when, for instance, the server is not configured as an STP-only CTN. The field indicates whether an STP-only migration stratum-1 configuration has been defined for the server. When the field is, for instance, one, the NSCIB includes the stratum-1 configuration that is to become current when the CTN ID at the server is modified to an STP-only configuration. When the field is, for instance, zero, a change is being made from one STP only SCIB to another, not migrating from a mixed STP/ETR network to an STP only network.

i) Single CEC CTN (X) 318: This field is valid when the configuration type specifies a single server definition and when one, as an example, indicates the CTN is a single CEC CTN. When the field is, for instance, zero, the CTN is not a single CEC CTN.

j) Recovery Configuration (R) 320: This field indicates whether the stratum-1 configuration described by this block is the result of a stratum-1 recovery action or a console command.

k) Stratum-1 Maximum Short Term Skew Rate Change 322: This field includes a value that specifies the maximum possible change in the skew rate of the physical oscillator at the new stratum-1 server that may occur over any specified period (e.g., 1 second).

l) New CTN ID 324: This field is valid when the CTN-ID change indicator specifies a CTN ID change request and a valid CTN ID. This field specifies the new CTN ID.

If the new stratum-1 configuration information block is not to be used to specify an update to the CTN ID, then the block may not include the CTN ID change bit or the new CTN ID, as an example.

In one example, to determine whether an active stratum-1 server has failed, a console assisted recovery procedure is used. For instance, an inactive stratum-1 server uses the procedure, when it loses coupling link communication with the active stratum-1 server, to communicate from its console to the console of the active stratum-1. In particular, the inactive stratum-1 server uses the procedure to determine if the active stratum-1 has entered a failure state. If it can definitively determine that the active stratum-1 server has failed, the inactive stratum-1 server can then become the active stratum-1 server for the CTN. Difficulties arise, however, when it cannot definitively determine that the active stratum-1 server has failed or if it is determined that the active stratum-1 server has not failed, but there is a recovery situation. In such situations, different recovery actions may be needed.

In accordance with an aspect of the present invention, the console assisted recovery procedure is used to determine how to proceed regardless of whether failure can be definitively determined. The console assisted recovery procedure provides various state information that is used to make recovery decisions. This state information includes the versions the servers are using (i.e., the level of capability of the servers), and the actual operating stratum of the servers. As one example, the level of capability of a server includes a level of timing capability for the server, including aspects related to STP timing. These aspects include, for instance, recovery, configuration, time management, formatting of time synchronization messages and/or TOD clock synchronization. The level of capability for a server, which is reflected by a version number, is used to define or determine the rules used in recovery or to take corrective action, such as which server is to be the active stratum-1 server; which server, if any, is to take over for another server as, for instance, an active stratum-1 server; which server, if any, is to surrender its role, such as, for instance, an active stratum-1 server, etc. It allows one server to predict how another server will behave in certain situations, such as recovery situations or other situations in which action is to be taken.

With this state information, many situations can be detected and corrected, including those situations in which both servers remain active after coupling communication has been lost. For instance, situations that result in both servers being unsynchronized (e.g., both are stratum-0 servers) and situations that result in both servers being active stratum-1 servers (i.e., island conditions) can be detected and corrected.

One embodiment of the logic of a console assisted recovery procedure used in one or more aspects of the present invention to provide a failsafe recovery capability is described with reference to FIG. 4A. In this logic, reference is made to Server Y and Server Z, which are similar to the servers described with reference to FIGS. 1A and 1B.

Figure 4A:
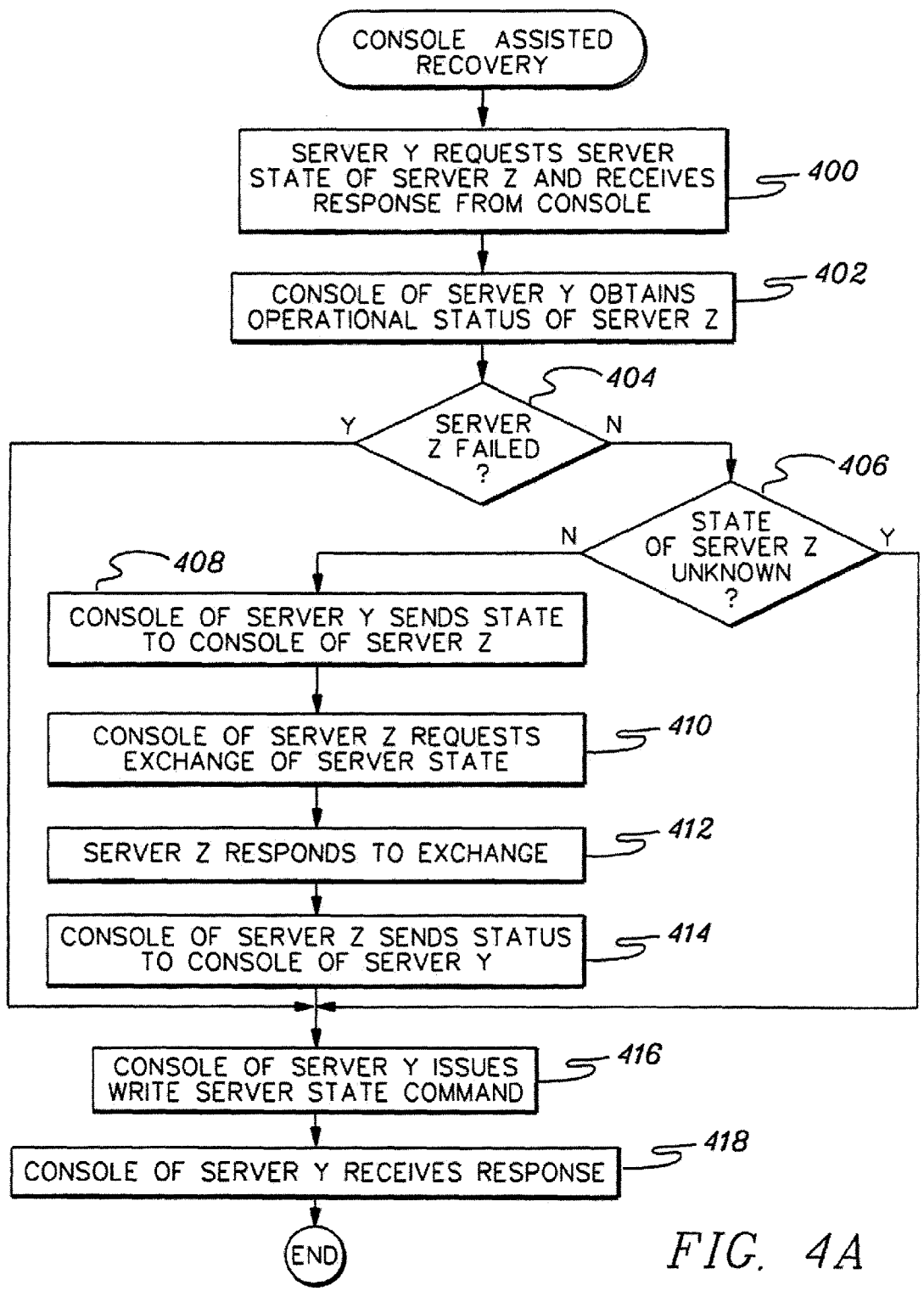
FIG. 4A depicts one example of a console assisted recovery procedure, in accordance with an aspect of the present invention.

Referring to FIG. 4A, initially a server that suspects that recovery may be needed (e.g., Server Y) requests server state of another server (e.g., Server Z), STEP 400. In one example, a request server state command, described below, is used to request the operational status of the server. The request includes the stratum and version information (e.g., minimum version number and maximum version number) of Server Y. In particular, Server Y sends the request server state command to its console, and in response thereto, receives a response that the console is processing the request. The console obtains the operational status of Server Z, STEP 402.

The Server Y console determines whether Server Z is in a failed state, INQUIRY 404. If Server Z is not in a failed state, a further determination is made as to whether the state of Server Z is unknown, INQUIRY 406. Should the state be unknown, then processing proceeds to STEP 416.

However, if the state is known, but not failed, the console of Server Y sends various state information to the console of Server Z, STEP 408. This information includes, for instance, the stratum level and version of Server Y. In response thereto, the console of Server Z requests an exchange of server state, STEP 410. For instance, the console of Server Z sends Server Z an exchange server state command request, an example of which is described below. Server Z responds to this request by sending its console an exchange server state command response, STEP 412.

The console of Server Z sends the state information, including, for instance, the stratum level and version information of Server Y and Server Z, to the console of Server Y, STEP 414.

The console of Server Y sends Server Y a write server state command request, STEP 416, and receives a command response, STEP 418. This information is then used to make recovery decisions, as further described below. At this point, both Servers Y and Z have the same knowledge of the state information of both servers.

Returning to INQUIRY 404, if it is determined that Server Z has failed, then processing proceeds to STEP 416, bypassing the exchange of state information. Again, information obtained is used to make recovery decisions.

The decisions made for recovery depend on the situation and the obtained state. Several situations are described below.

In one situation, Server Y and Server Z are both stratum-0 servers. If a previously active stratum-1 server or an inactive stratum-1 server finds itself at a stratum-0 level, it initiates the console assisted recovery procedure. The server initiating the procedure is Server Y and the other server is Server Z. As a result of the procedure, both Servers Y and Z know that there is a two stratum-0 situation and both know the level of capability of each (i.e., version number). Therefore, both understand the rules to be followed in taking corrective action. Thus, in this situation, the server that was previously defined as the primary stratum-1 server resumes its role as the active stratum-1 server. The primary stratum-1 server is indicated in the Stratum-1 Configuration Information Block, an example of which is described above with reference to FIG. 2.

In another situation, a server that was previously an inactive stratum-1 server (Server Y) finds itself taking over the role of an active stratum-1 server. Thus, Server Y initiates the console assisted recovery procedure. Again, the server initiating the procedure is Server Y and the other server is Server Z. If Server Y determines via the procedure that the old active stratum-1 server is still functioning as the active stratum-1 server, then the inactive stratum-1 server surrenders its role as the active stratum-1 server in order to avoid an island condition (as specified by the predefined rules indicated by the version numbers of the servers).

In yet a further situation, a server that is an active stratum-1 server finds itself maintaining the role of the active stratum-1 server after a recovery situation. Thus, the active stratum-1 server initiates the console assisted recovery procedure. The active stratum-1 server is Server Y, since it is initiating the procedure. If Server Y determines via the procedure that the old inactive stratum-1 server is now also functioning as the active stratum-1 server, then Server Y retains the role of the active stratum-1 server.

Figure 4B:
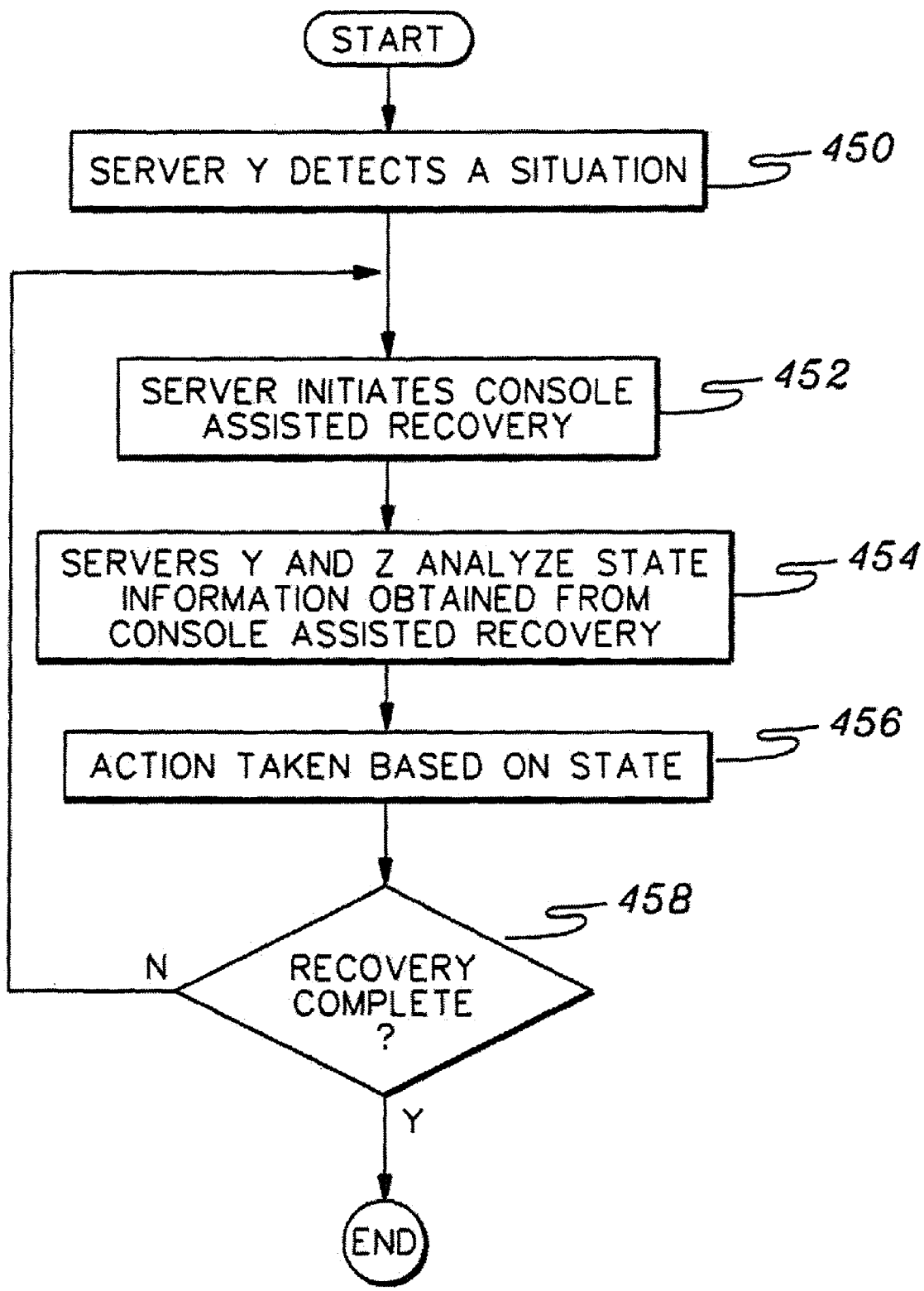
FIG. 4B depicts one example of an overview of the logic to initiate a console assisted recovery procedure and to take action based on the information provided from that procedure, in accordance with an aspect of the present invention.

Thus, with reference to FIG. 4B, the above processing for the various situations can be summarized, as follows. Server Y detects a situation that is suspect, STEP 450, and initiates the console assisted recovery procedure, STEP 452. In response to executing the procedure, state information is obtained and analyzed by Servers Y and Z, STEP 454. Based on that analysis, action is taken, as described above, STEP 456. If this procedure ended up in a situation where recovery is not complete (possibly due to Server Z being in an unknown state or possibly due to Server Z being in a state that prohibits Server Y from becoming the active stratum-1 server), INQUIRY 458, the procedure will loop back to STEP 452 and try again.

The action taken is to ensure that only a single active stratum-1 server exists at any point in time in the CTN in order to maintain synchronization and data integrity. In this example, the only two servers in the CTN allowed to assume that role are the primary and alternate stratum-1 nodes defined in the SCIB. The console assisted recovery path can be used to determine when both the primary and alternate stratum-1 nodes are functioning as stratum 0's or both are functioning as stratum 1's. In response to detecting this situation, it can be corrected with the base rule that only the primary stratum-1 defined in the SCIB can play the active stratum role.

The two servers are to act in a comparable manner: when one server assumes the role of the active stratum-1 server, the other gives up the role of the active stratum-1 server in order to avoid an island condition. The servers use version numbers of the code of the servers, known by both servers, to make the decision on assuming or giving up the role of the active stratum-1 server.

In addition to the above in which a loss of communication between the inactive stratum-1 and the active stratum-1 is detected by the inactive stratum-1 server, which then initiates the console assisted recovery procedure, initial indication of a failed active stratum-1 server may be provided by a stratum-1 system check signal (SCS). The stratum-1 system check signal indicates to the inactive stratum-1 server in a dual server CTN configuration that the active stratum-1 server has entered a state that prevents it from continuing to act as the active stratum-1 server for the CTN.

The inactive stratum-1 in a dual server CTN configuration recognizes the SCS when it detects that the active stratum-1 server has terminated STP connectivity to the inactive stratum-1 server. The inactive stratum-1 server detects that the active stratum-1 server has terminated STP connectivity when it receives the offline signal on the last path in the STP path group associated with the active stratum-1 server.

The active stratum-1 server in a dual server CTN configuration recognizes that it has issued the SCS when it terminates STP connectivity to the inactive stratum-1 server. The active stratum-1 considers STP connectivity to the inactive stratum-1 server to have been terminated when it sends the offline signal on the last path(s) in the STP path group associated with the inactive stratum-1 server.

It has been found that there exist some situations where the offline signal received on the last path(s) in the STP path group to the active stratum-1 server by the inactive stratum-1 server could not definitively be interpreted as a situation where the active stratum-1 server has failed. In addition, it has also been found that there exist some situations where the offline signal sent on the last path(s) in the STP path group to the inactive stratum-1 server had failed. So the resulting situations could exist: (1) Both servers are unsynchronized stratum 0's; (2) Both servers are active stratum-1 servers. In situation (1), the entire CTN loses synchronization, and in situation (2), as mentioned previously, a data integrity situation can result.

Figure 5:
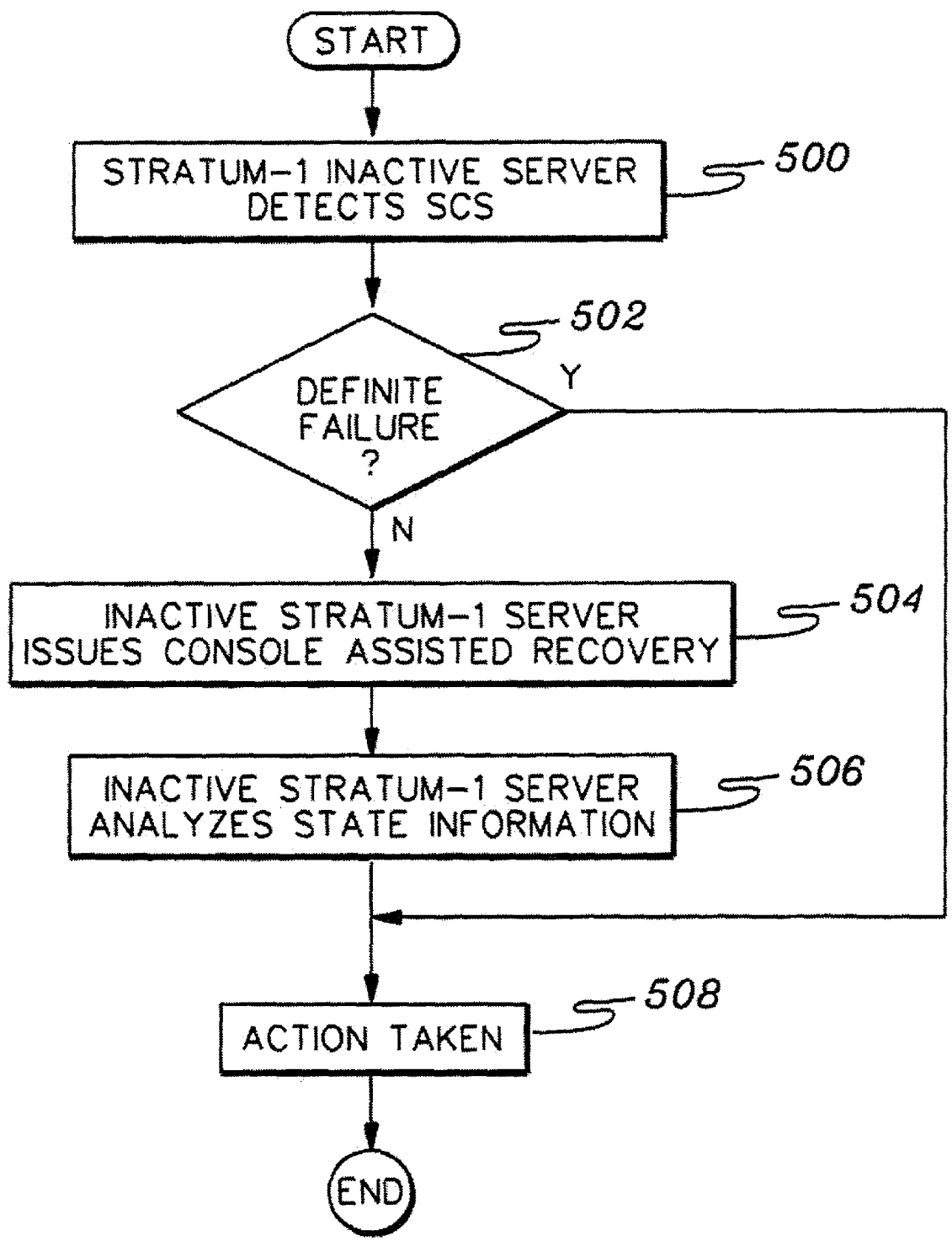
FIG. 5 depicts one example of logic associated with detecting a system check signal, in accordance with an aspect of the present invention.

Thus, in accordance with an aspect of the present invention, processing of the SCS includes a further check, as described with reference to FIG. 5. Initially, the inactive stratum-1 server detects the SCS in a diad configuration, STEP 500. If the SCS signal can be interpreted as the active stratum-1 has failed, STEP 502, action is taken by the inactive stratum-1, STEP 508. This action includes, for instance, taking over as the active stratum-1 server. In one example, after this sequence, the failsafe use of the console assisted recovery procedure can be used to detect if two stratum 1's have resulted.

Returning to INQUIRY 502, if it cannot be definitively determined that the active stratum-1 server has failed via the SCS signal, then the inactive stratum-1 server issues the console assisted recovery procedure, as described above, STEP 504. The state information provided by the console assisted recovery procedure is analyzed by, for instance, the inactive stratum-1 server and the active stratum-1 server, STEP 506, and action is taken based on that analysis, also described above, STEP 508.

Figure 6A:
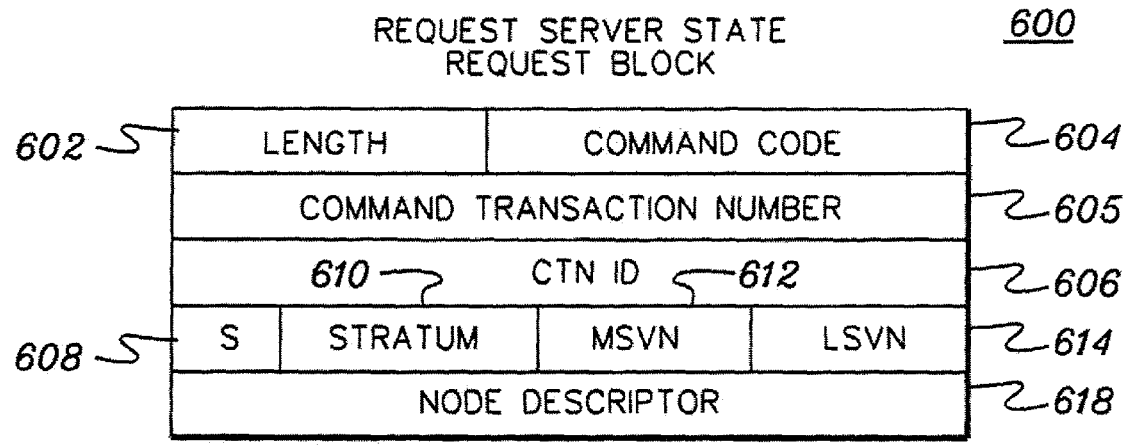
FIG. 6A depicts one embodiment of a request server state request block, in accordance with an aspect of the present invention.

The console assisted recovery procedure uses various commands, each of which is described below. One command that is used is the request server state command, which is used to request the operational status of the server specified by the node descriptor in the request block. For servers that support a Maximum Supported Version Number (MSVN) greater than one, the command request block includes certain status information of the server issuing the command, including the stratum level and STP version numbers supported. The status of the specified server is provided asynchronously by the console using the write server state command, described below. One embodiment of a command request block for the request server state command is described with reference to FIG. 6A.

A request server state request block 600 includes, for instance, the following:
 a) Length 602: This field includes a value specifying a command block length.
 b) Command Code 604: This field specifies the request server state command.
 c) Command Transaction Number 605: This field includes a value that is associated with the command being issued. The command transaction number is returned in the response block for the command.
 d) CTN ID 606: For servers with MSVN (described below) greater than 1, this field includes the CTN ID of the server sending the command. Otherwise, this field is reserved and set to zero.
 e) Status Valid (S) 608: This field, when set to one, indicates that the values of the stratum, MSVN, and LSVN fields, described below, are valid.

f) Stratum 610: When valid, this field includes the stratum level of the server sending the command. When not valid, this field is reserved and set to zero. The field is valid when S is set to one.

g) Maximum Supported Version Number (MSVN) 612: When valid, this field includes the MSVN of the server sending the command. When not valid, this field is reserved and set to zero. The field is valid when S is set to one.

h) Lowest Supported Version Number (LSVN) 614: When valid, this field includes the LSVN of the server sending the command. When not valid, this field is reserved and set to zero. The field is valid when bit S is set to one.

i) Node Descriptor 618: This field includes a node descriptor of the server for which status is being requested.

Figure 6B:
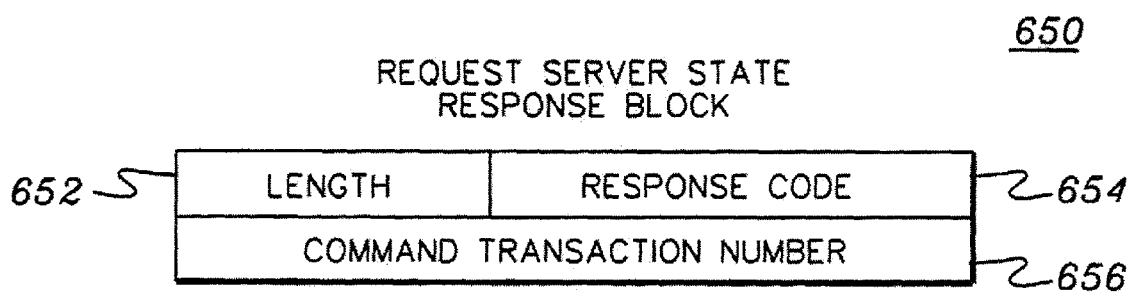
FIG. 6B depicts one embodiment of a request server state response block, in accordance with an aspect of the present invention.

One embodiment of a command response block 650 for the request server state command is described with reference to FIG. 6B. Response block 650 includes, for instance:

a) Length 652: This field includes a value specifying a command block length.

b) Response Code 654: This field includes the response code for the command.

c) Command Transaction Number 656: This field includes the value provided in the command transaction number field of the command request block.

Another command used by the console assisted recovery procedure is the exchange server state command. The exchange server state command sends server state information about a requesting server in the request block to a responding server and retrieves server state information about the responding server in the response block (in addition to echoing back the state information about the requesting server that was sent in the request block so that the states of both servers are available). A requester node descriptor in the request block identifies the server for which state information is being provided in the request block. The command is issued by the console of the server specified in the responder node descriptor field of a request server state command and is issued to the server specified in that same field. The request server state command provides the server state information of the requesting server and the node descriptors of both the requesting and responding servers.

Figure 7A:
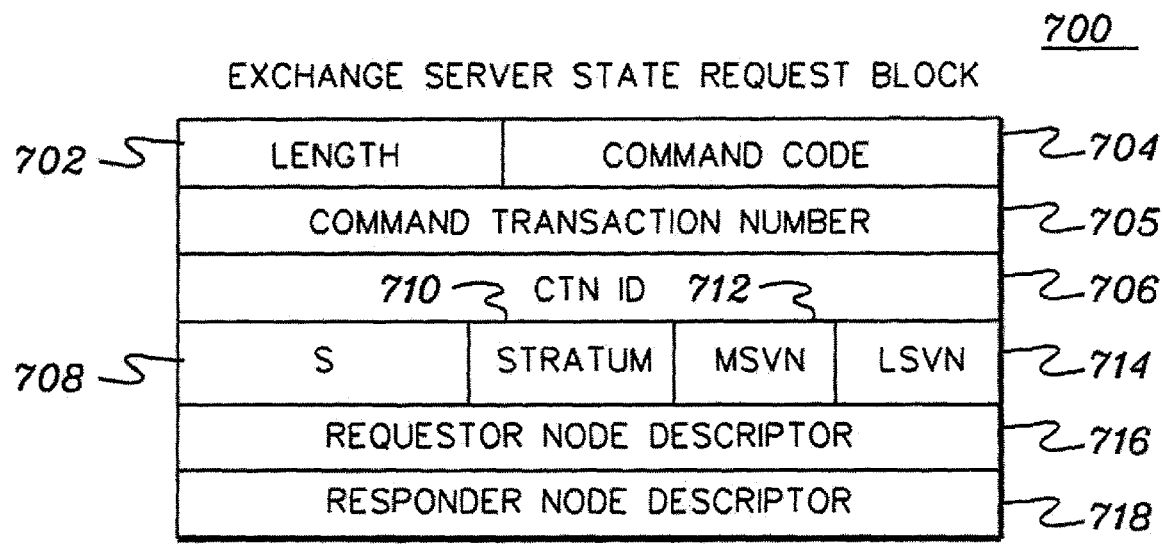
FIG. 7A depicts one embodiment of an exchange server state request block, in accordance with an aspect of the present invention.

One embodiment of a command request block for the exchange server state command is described with reference to FIG. 7A. In one example, an exchange server state request block 700 includes the following:

a) Length 702: This field includes a value specifying a command block length.

b) Command Code 704: This field includes a value specifying the exchange server state command.

c) Command Transaction Number 705: This field includes a value that is associated with the command being issued. The command transaction number is returned in the response block for the command.

d) CTN ID 706: This field includes the CTN ID of the server sending the command.

e) Status Valid (S) 708: This field, when set to one, indicates that the stratum, MSVN and LSVN fields are valid. When this field is zero, the stratum, MSVN and LSVN fields are reserved and set to zero.

f) Stratum 710: When valid, this field includes the stratum level of the server specified by the requestor node descriptor at the request block. When not valid, this field is reserved and set to zero. The field is valid when S is set to one.

g) Maximum Supported Version Number (MSVN) 712: When valid, this field includes the MSVN of the server specified by the requestor node descriptor of the request block. When not valid, this field is reserved and set to zero. The field is valid when S is set to one.

h) Lowest Supported Version Number (LSVN) 714: When valid, this field includes the LSVN of the server specified by the requester node descriptor of the request block. When not valid, this field is reserved and set to zero. The field is valid when S is set to one.

i) Requestor Node descriptor 716: This field includes the node descriptor of the server that has requested status of another server via a request server state command.

j) Responder Node descriptor 718: This field includes the node descriptor of the server for which status is being requested.

Figure 7B:
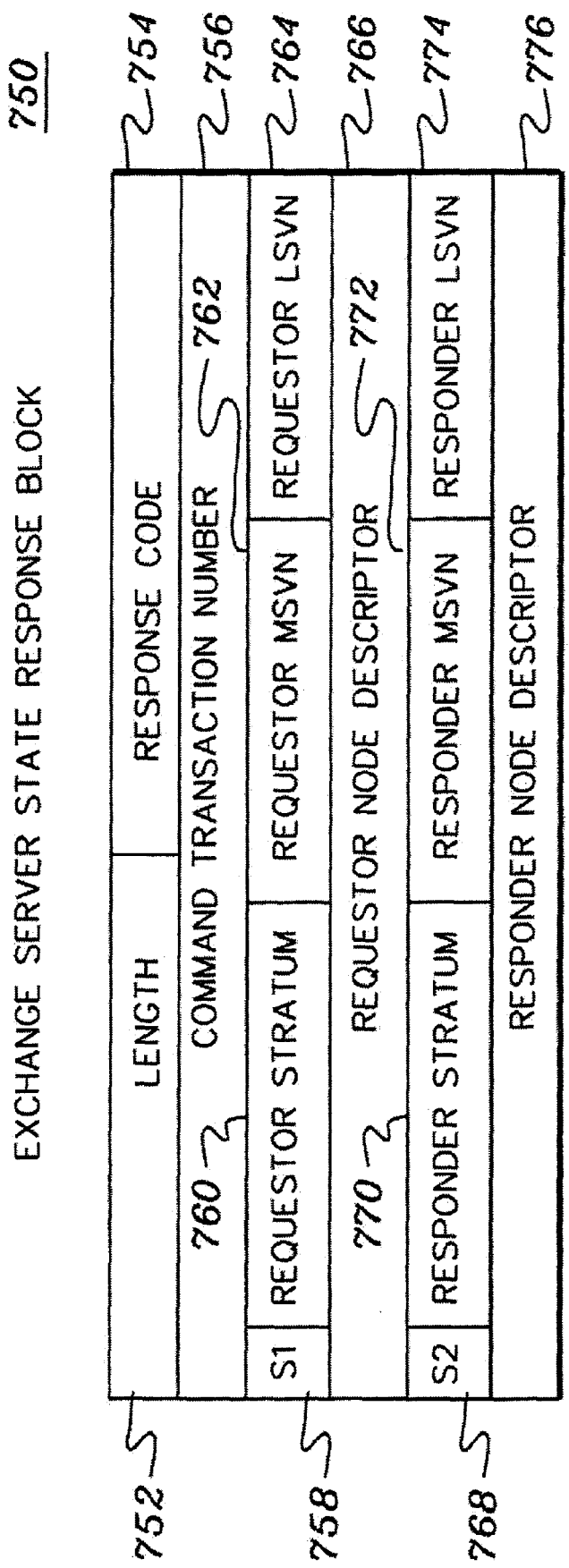
FIG. 7B depicts one embodiment of an exchange server state response block, in accordance with an aspect of the present invention.

One embodiment of a command response block 750 for the exchange server state command is described with reference to FIG. 7B. Response block 750 includes, for instance:

a) Length 752: This field includes a value specifying a command block length.

b) Response Code 754: This field includes the response code for the command.

c) Command Transaction Number 756: This field includes the value provided in the command transaction number field of the command request block.

d) Requestor Status Valid (S1) 758: This field, when set to one, indicates that the requestor stratum, MSVN and LSVN fields are valid. When this field is zero, those fields are reserved and set to zero.

e) Requestor Stratum 760: When valid, this field includes the stratum level of the server specified by the requestor node descriptor of the request block. When not valid, this field is reserved and set to zero. The field is valid when S1 is set to one.

f) Requestor Maximum Supported Version Number 762: When valid, this field includes the MSVN of the server specified by the requester node descriptor of the request block. When not valid, this field is reserved and set to zero. The field is valid when S1 is set to one.

g) Requestor Lowest Supported Version Number 764: When valid, this field includes the LSVN of the server specified by the requestor node descriptor of the request block. When not valid, this field is reserved and set to zero. The field is valid when S1 is set to one.

h) Requester Node descriptor 766: This field includes the node descriptor specified in the requestor node descriptor field in the command request block.

i) Responder Status Valid (S2) 768: This field, when set to one, indicates that the responder stratum, MSVN and LSVN fields are valid. When this field is zero, those fields are reserved and set to zero.

j) Responder Stratum 770: When valid, this field includes the stratum level of the server specified by the responder node descriptor of the response block. When not valid, this field is reserved and set to zero. The field is valid when S2 is set to one.

k) Responder Maximum Supported Version Number (MSVN) 772: When valid, this field includes the MSVN of the server specified by the responder node descriptor of the request block. When not valid, this field is reserved and set to zero. The field is valid when S2 is set to one.

l) Responder Lowest Supported Version Number 774: When valid, this field includes the LSVN of the server specified by the responder node descriptor of the response block. When not valid, this field is reserved and set to zero. The field is valid when S2 is set to one.

m) Responder Node descriptor 776: This field includes the node descriptor of the server for which status is being provided.

A further command used by the Console Assisted Recovery procedure is the write server state command. The write server state command is used to provide information regarding the operational state and certain parameters of another server or to instruct the receiving server to enter a new operating state. The state code field indicates whether the state code applies to another server or to the server receiving the command. When the state code applies to another server, the node descriptor field identifies the server to which the state code applies.

Figure 8A:
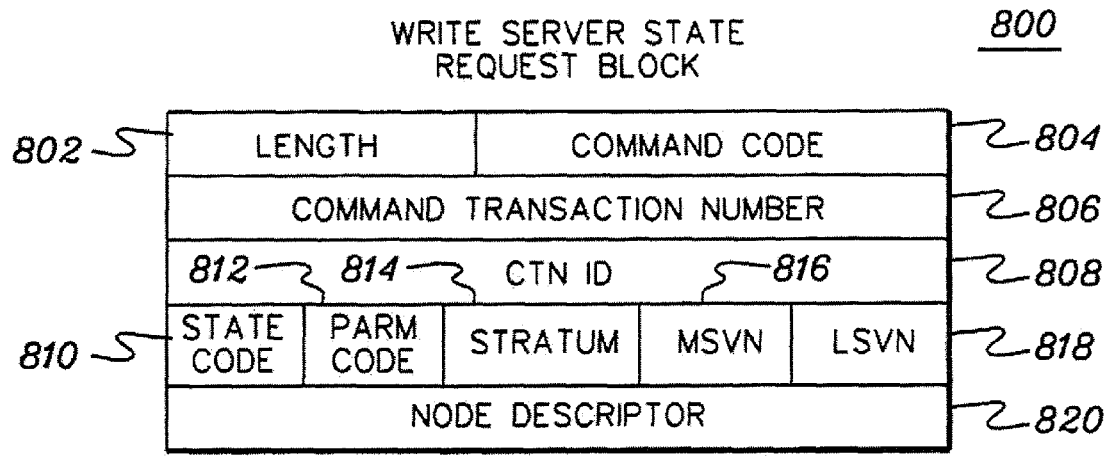
FIG. 8A depicts one embodiment of a write server state request block, in accordance with an aspect of the present invention.

One embodiment of a command request block for the write server state command is described with reference to FIG. 8A. In one example, a write server state request block 800 includes the following:

a) Length 802: This field includes a value specifying a command block length.

b) Command Code 804: This field includes a value specifying the write server state command.

c) Command Transaction Number 806: This field includes a value that is associated with the command being issued. The command transaction number is returned in the response block for the command.

d) CTN ID 808: For servers with an MSVN greater than 1, this field includes the CTN ID of the server sending the command. Otherwise, this field is reserved and set to zero.

e) State Code 810: This field includes a state code (e.g., 4-bits), as defined below.

| Hex Code | |
|---|---|
| 0 | The state of the server specified by the node descriptor field is operational. |
| 1 | The state of the server specified by the node descriptor field is unknown. |
| 2 | The state of the server specified by the node descriptor field is in the checkstopped state. |
| 3 | The state of the server specified by the node descriptor field is powered off. |
| 4 | The server receiving this command is to be put into the lost-clock call-home-disabled state. While in this state, a server does not perform a call home when it detects a lost-clock condition. |
| 5-F | Reserved. | f) Parameter Code (PC) 812: This field includes a state code (e.g., 2-bits), as defined below.

| Code | |
|---|---|
| 0 | Stratum, MSVN and LSVN fields are reserved and set to zero - the fields are not defined for this STP version level. |
| 1 | The parameters in Stratum, MSVN and LSVN include valid information. |
| 2 | The parameters in Stratum, MSVN and LSVN do not include valid information - the server specified by the node descriptor indicated with a response code that it does not support the console exchange server state command required to obtain the parameters. |
| 3 | The parameters in Stratum, MSVN and LSVN do not include valid information - the console was not able to issue an exchange server state command to the server specified by the node descriptor or did not receive a response to the exchange server state command from the server specified by the node descriptor. | g) Stratum 814: When valid, this field includes the stratum level of the server specified by the node descriptor of the request block. When not valid, this field is reserved and set to zero. The field is valid when the PC field is set to, for instance, b'01'.

h) Maximum Supported Version Number (MSVN) 816: When valid, this field includes the MSVN of the server specified by the node descriptor of the request block. When not valid, this field is reserved and set to zero. The field is valid when the PC field is set, for instance, to b'01'.

i) Lowest Supported Version Number (LSVN) 818: When valid, this field includes the LSVN of the server specified by the node descriptor of the request block. When not valid, this field is reserved and set to zero. The field is valid when the PC field is set to, for instance, b'01'.

j) Node Descriptor 820: This field includes the node descriptor of the server for which status is being reported.

Figure 8B:
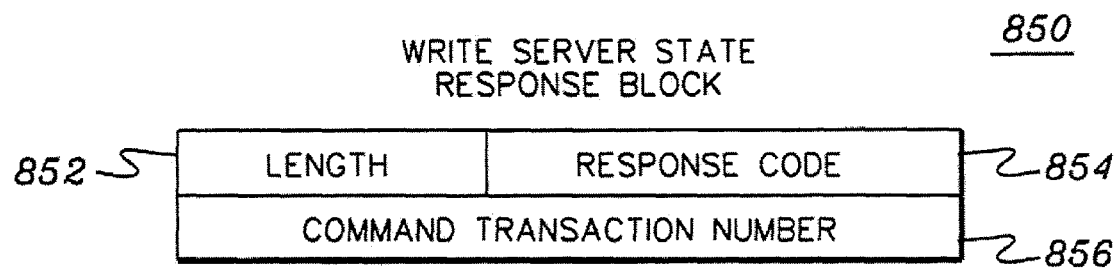
FIG. 8B depicts one embodiment of a write server state response block, in accordance with an aspect of the present invention.

One embodiment of the command response block for the write server state command is described with reference to FIG. 8B. In one example, a write server state response block 850 includes the following:

a) Length 852: This field includes the value specifying a command block length.

b) Response Code 854: This field includes the response code for the command.

c) Command Transaction Number 856: This field includes the value provided in the command transaction number field of the command request block.

In one embodiment, it is advantageous to detect/correct the recovery situation as soon as possible. In those environments in which there are multiple communication paths in the network, including, for instance, a console communication path and a coupling link path established via the Establish STP Path (ESP) procedure, the situation can be detected/corrected via the multiple paths. Thus, in this embodiment, it is to be detected/corrected via the path that resumes first, whether it be via the console communication path or the coupling link path.

As one example, when coupling link communication resumes between the original active stratum-1 and the inactive stratum-1, after losing communication, the state information described above can be communicated between the systems during an Establish STP Path procedure. This state information can be used to detect recovery situations (i.e., invalid situations, such as two stratum 0's or two stratum 1's) and to take corrective actions following the rules described above.

Figure 9:
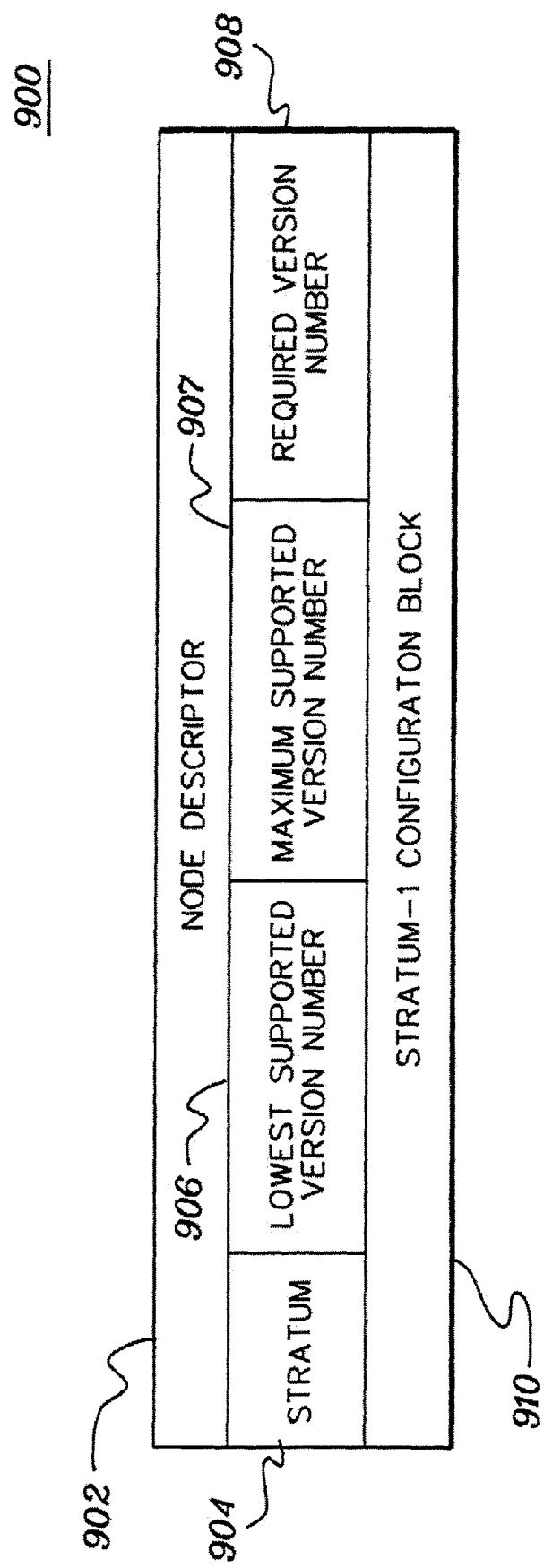
FIG. 9 depicts one embodiment of a message command operation dependent area for an establish STP path operation, in accordance with an aspect of the present invention.

The Establish STP Path (ESP) operation is performed as part of the STP path initialization procedure to establish a path between two servers (e.g., a path between Server B and Server C of FIG. 1A or FIG. 1B). The operation is used to exchange and validate certain parameters associated with each of the attached servers. Associated with the ESP operation is a message command operation dependent area, an example of which is described with reference to FIG. 9. As one example, a message command operation dependent area 900 includes:

a) Node Descriptor 902: This field includes the CPC node descriptor of the server sending the command.

b) Stratum 904: This field includes the stratum of the server sending the command.

c) Lowest Supported Version Number 906: When the MSVN of the server sending the ESP message command is greater than one, this field is set to the lowest supported version number (LSVN) for the server sending the command or, if a version number update is pending at the server, is set to the new lowest supported version number (NLSVN). When the MSVN of the server issuing the ESP message command is one, this field is reserved and set to zero.

d) Maximum Supported Version Number 907: This field is set to the maximum supported version number (MSVN) of the server sending the command or, if a version number update is pending at the server, is set to the new maximum supported version number (NMSVN).

e) Required Version Number 908: This field specifies the STP version number that is to be used for communication between the two servers. When the value is zero and the MSVN of the server sending the ESP message command is greater than one, the server sending the command is able to operate at any version from the LSVN up to and including the MSVN. When the MSVN of the server sending the ESP message command is one, the server sending the command operates at version one regardless of the state of this field.

f) Stratum-1 Configuration Block 910: This field includes the stratum-1 configuration block for the server sending the message command.

The ESP message response block does not have any operation-dependent data. The following example responses are valid for the operation:

Successful: The message command was successfully performed.

STP Not Enabled: The STP facility is installed, but not enabled at the attached server.

Busy: The message command cannot be performed at this time due to busy conditions or resource contention.

Invalid Operation Parameters: The message command contains invalid parameters.

Configuration Error: The message command contains a mismatched CTN ID.

Node Descriptor Error: The node descriptor in the ESP message command is invalid. The node descriptor value provided in the message command is stored in the link information block at the receiving server.

Unsupported Version: The required version number in the ESP message command is not supported by the receiving server. The required version number provided in the message command is stored in the link information block at the receiving server.

Stratum-1 Configuration Error: The stratum-1 configuration information block in the ESP message command is not compatible with the stratum-1 configuration at the receiving server.

Self-Coupled Server: The node descriptor of the attached server is identical to the node descriptor of this server, indicating that this server is coupled to itself.

Takeover-Active State: The arbiter received an ESP command from the primary stratum-1 server while the arbiter was in the takeover-active state and the primary specified itself as the active stratum-1 server.

Allowable Paths Exceeded: The server cannot support any additional STP paths.

CF Response: The response codes indicate that the STP facility is not supported at the attached server.

When two servers establish an STP path using the establish STP path (ESP) procedure, each communicates in its ESP message command the range of STP versions supported by each and, as part of the ESP procedure, agree to utilize the highest version supported by each server. Communication between any two servers that have an established path adheres to the negotiated STP version number.

Further details regarding ESP are described in U.S. Ser. No. 11/940,518, entitled "Server Time Protocol Messages and Methods," filed Nov. 15, 2007, and in a U.S. Patent Application entitled "Coordinated Timing Network Having Servers of Different Capabilities," co-filed herewith, which also describes further information regarding version numbers, each of which is hereby incorporated herein by reference in its entirety.

Although the console and coupling link paths are described herein, this capability is also extendible to other communications paths if they exist between the two systems.

Described in detail above is a console assisted recovery communication that includes version information and stratum of a still functioning system. Note that this same situation could also result when code bugs in the recovery flow escaped code reviews and/or testing environments in both a diad or triad configuration.

In one embodiment, one or more aspects of the present invention can be executed in a processing environment that is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-05, April 2007, which is hereby incorporated herein by reference in its entirety. In such an environment, instructions and/or logic, which is specified in the z/Architecture® and designed to execute on a z/Architecture® machine, is emulated to execute on an architecture other than the z/Architecture®. One example of this processing environment is described with reference to FIGS. 10-11.

Figure 10:
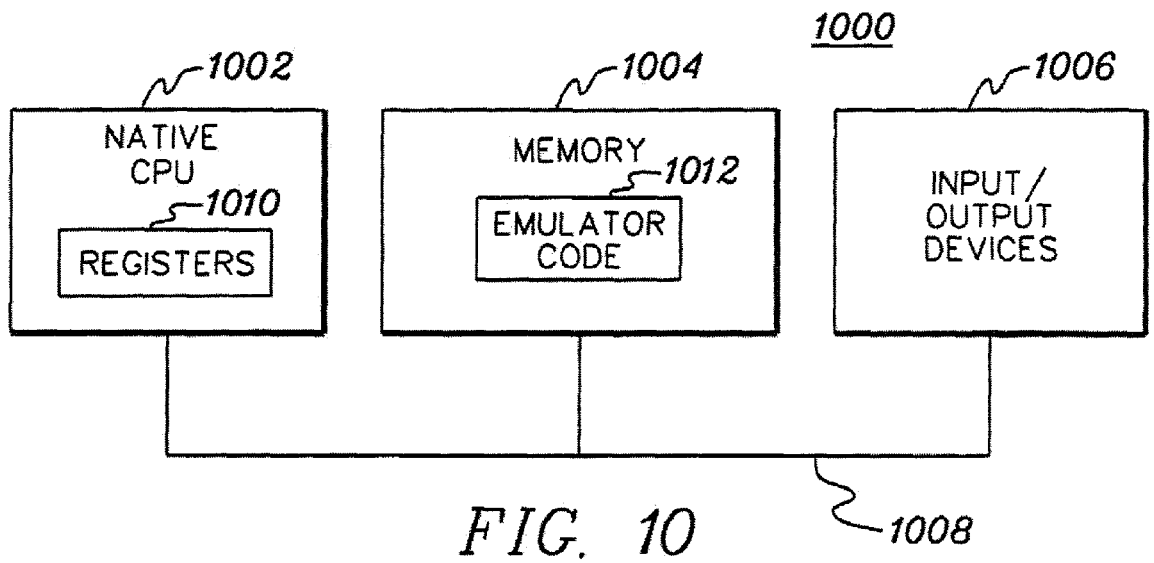
FIG. 10 depicts one embodiment of a processing environment to incorporate and use one or more aspects of the present invention.

Referring to FIG. 10, one embodiment of a processing environment to incorporate and use one or more aspects of the present invention is described. Processing environment 1000 includes, for instance, a native central processing unit 1002, a memory 1004 (e.g., main memory) and one or more input/output (I/O) devices 1006 coupled to one another via, for example, one or more buses 1008 and/or other connections. As examples, processing environment 1000 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 1002 includes one or more native registers 1010, such as one or more general purpose registers and/or one or more special purpose registers, used during processing within the environment. These registers include information that represent the state of the environment at any particular point in time.

Moreover, native central processing unit 1002 executes instructions and code that are stored in memory 1004. In one particular example, the central processing unit executes emulator code 1012 stored in memory 1004. This code enables the processing environment configured in one architecture to emulate another architecture. For instance, emulator code

1012 allows machines based on architectures other than the z/Architecture®, such as Power PC® processors, pSeries® servers, xSeries® servers, HP Superdome® servers, or others to emulate the z/Architecture® and to execute software and instructions developed based on the z/Architecture®.

Figure 11:
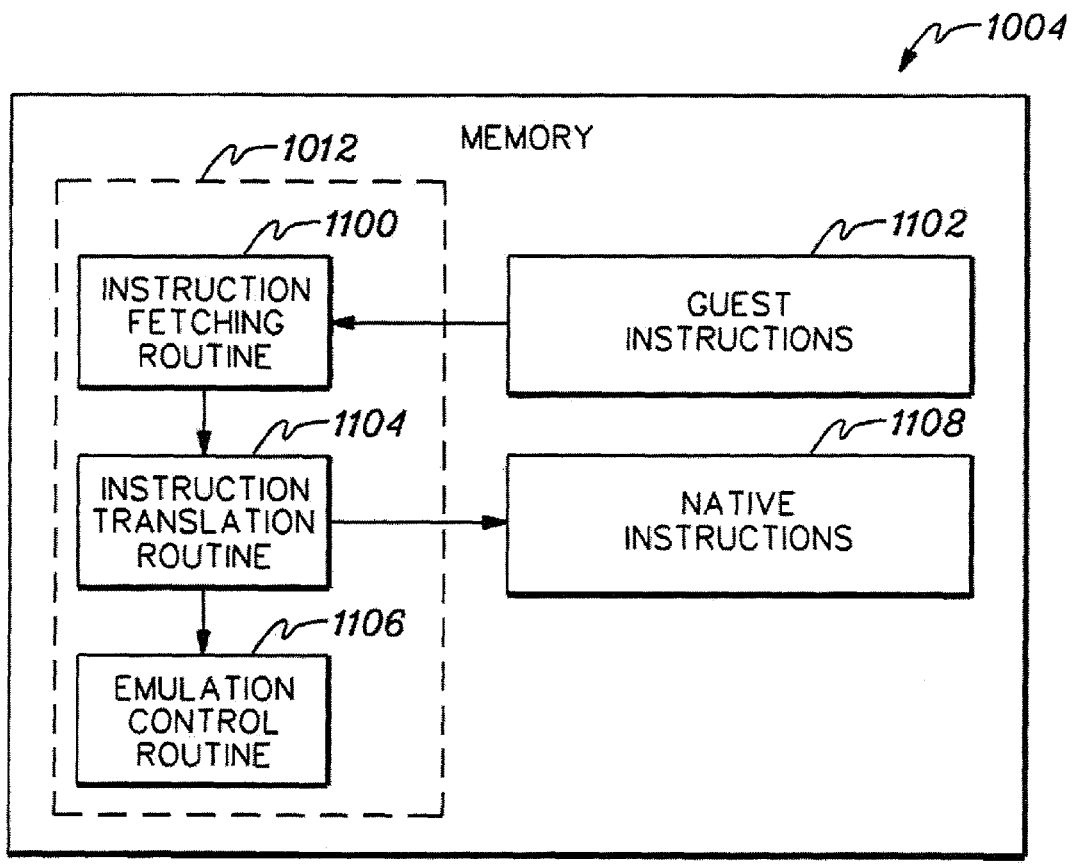
FIG. 11 depicts further details of the memory of FIG. 10, in accordance with an aspect of the present invention.

Further details relating to emulator code 1012 are described with reference to FIG. 11. Guest instructions 1102 comprise software instructions (e.g., machine instructions) that were developed to be executed in an architecture other than that of the native CPU. For example, guest instructions 1102 may have been designed to execute on a z/Architecture® processor, but are instead being emulated on native CPU 1002 (which may be for example an Intel® Itanium® 2 processor). In one example, emulator code 1012 includes an instruction fetching routine 1100 to obtain one or more guest instructions 1102 from memory 1004, and to optionally provide local buffering for the instruction obtained.

Emulator code 1012 further includes an instruction translation routine 1104 to determine the type of guest instruction that has been obtained and to provide one or more native instructions 1108 that correspond to the guest instruction. In one example, the providing includes creating during, for instance, a translation process, a native stream of instructions for a given guest instruction. This includes identifying the function and creating the equivalent native instructions. In a further example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

Emulator code 1012 further includes an emulation control routine 1106 to cause the native instructions to be executed. Emulation control routine 1106 may cause native CPU 1002 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 1108 may include loading data into a register from memory 1004; storing data back to memory from a register; or performing some type of arithmetic or logical operation, as determined by the translation routine. Each routine is, for instance, implemented in software, which is stored in memory and executed by the native central processing unit 1002. In other examples, one or more of the routines or operations are implemented in firmware, hardware, software or some combination thereof. The registers of the emulated guest processor may be emulated using the registers 1010 of the native CPU or by using locations in memory 1004. In embodiments, guest instructions 1102, native instructions 1108, and emulation code 1012 may reside in the same memory or may be dispersed among different memory devices.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 12:
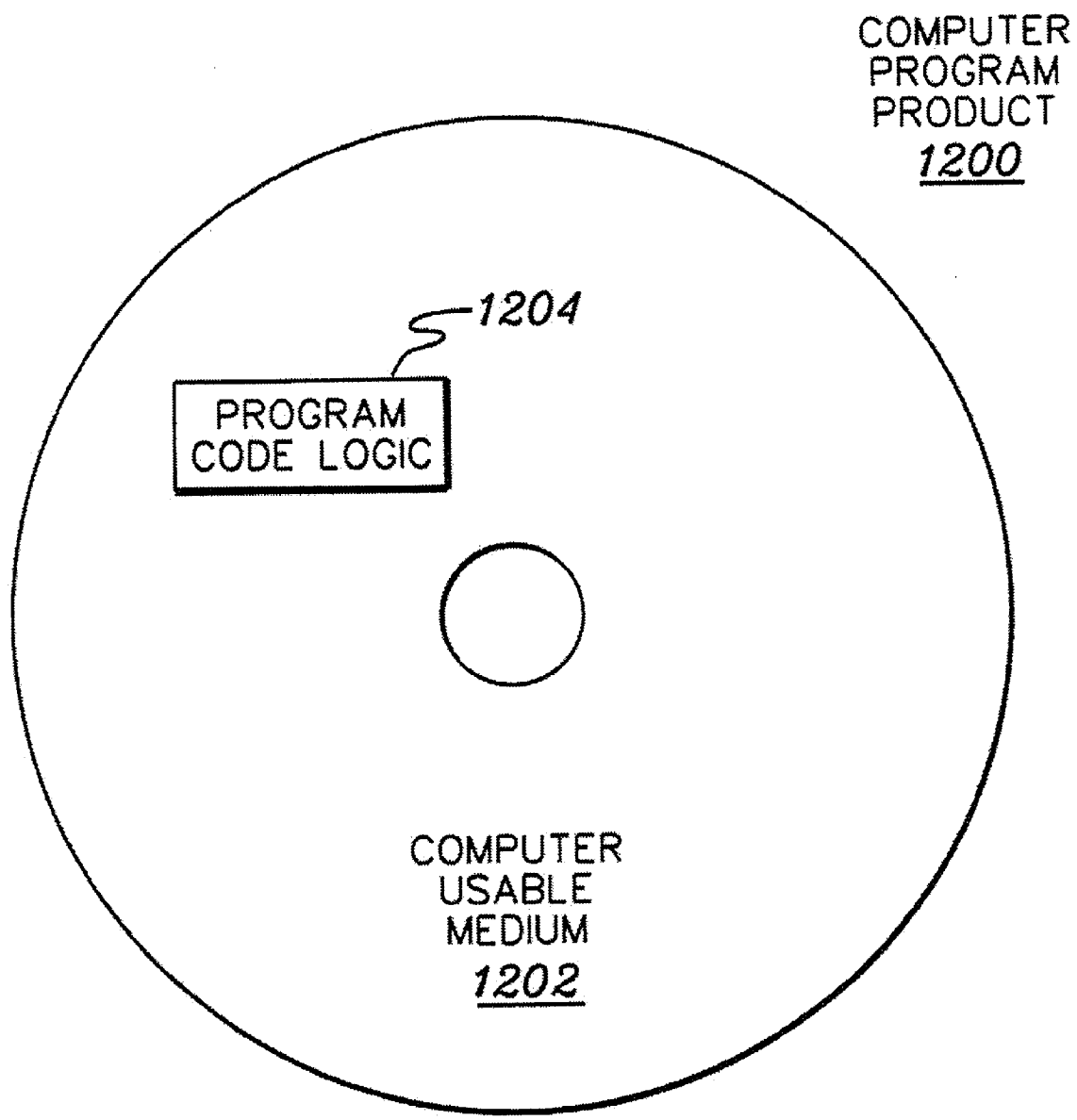
FIG. 12 depicts one example of a computer program product to incorporate one or more aspects of the present invention.

One example of an article of manufacture or a computer program product incorporating one or more aspects of the present invention is described with reference to FIG. 12. A computer program product 1200 includes, for instance, one or more computer usable media 1202 to store computer readable program code means or logic 1204 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Described herein are capabilities that facilitate the maintaining of time synchronization by multiple distinct computing systems to form a Coordinated Timing Network. Servers in the timing network make use of the Server Time Protocol to pass timekeeping information over existing high speed data links between systems that provide the capability for the time of day clocks at each system to be synchronized to the accuracy required in today's high end computing systems. The use of STP over high-speed, low latency links provides the capability to synchronize all systems in the CTN to the accuracy of, for instance, a few microseconds when based on a reference time provided by a single server.

STP provides the capability to set and maintain timekeeping information within the CTN, such as time zone, daylight savings time offset, and a leap seconds offset. The information may be updated within the CTN in a scheduled and coherent fashion, such that all changes occur at the same time at all servers in the CTN. This prevents potential system exposures and disruptions that occur when these parameters are updated in a haphazard fashion, creating time setting discrepancies between computers.

CTN parameters may be set and read by an operator via the STP console interface. CTN parameters include server connectivity, local time information, such as time zone and daylight savings time, and the leap seconds required to compute the UTC. The console itself is any element that provides an operator interface to display and set CTN parameters, and that has the capability to communicate with the STP facility.

A single active stratum-1 server is provided as the clock source for the network. The time of day clock at the active stratum-1 server may be set to any time, but generally, is set to an external time reference, such as a dial up to UTC. Other servers are permitted to join the CTN, if they have an undefined stratum-1 configuration, known as a null configuration, or if they have a stratum-1 configuration that matches that of the primary time server. Thus, synchronization accuracy within the CTN is not dependent on the quality of an external time source or even of the existence of an external time source at the stratum-1 server. This ensures that servers in the CTN are synchronizing to the same root primary reference time.

An alternate server is defined such that it is capable of taking over as the active stratum server in the event of a failure at the active stratum-1 server. This prevents a single point of failure for the CTN, such that servers in the CTN can maintain or regain synchronization within the timing network despite a failure at the active stratum-1 server.

Further, in accordance with an aspect of the present invention, a failsafe recovery capability is provided that detects/corrects error situations, such that a single stratum-1 server is maintained and data integrity is ensured. The selected corrective action is performed such that at least part of the timing network (e.g., at least one server) remains in timing synchronization. The failsafe capability uses status information, including stratum levels and version numbers, to detect/correct the situations. In one example, each server of a timing network (or a subset thereof) can have a different level of timing capability than other servers of the network, as indicated in the version numbers associated with the servers. The level of capability can change dynamically for one or more servers of the network.

Additional information regarding timing networks is provided in the following patent applications, each of which is hereby incorporated herein by reference in its entirety: U.S. Provisional Ser. No. 60/887,584 entitled "Facilitating Synchronization Of Servers In A Coordinated Timing Network," filed Jan. 31, 2007; U.S. Ser. No. 11/876,152 entitled "Facilitating Synchronization Of Servers In a Coordinated Timing Network," filed Oct. 22, 2007; U.S. Ser. No. 11/876,199 entitled "Definition Of A Primary Active Server In A Coordinated Timing Network," filed Oct. 22, 2007; U.S. Provisional Ser. No. 60/887,562 entitled "Defining A Stratum-1 Configuration In A Coordinated Timing Network", filed Jan. 31, 2007; U.S. Ser. No. 11/876,240 entitled "Employing Configuration Information To Determine The Role Of A Server In A Coordinated Timing Network", filed Oct. 22, 2007; U.S. Provisional Ser. No. 60/887,576 entitled "Method And System For Establishing A Logical Path Between Servers In A Coordinated Timing Network", filed Jan. 31, 2007; U.S. Ser. No. 11/876,272 entitled "Establishing A Logical Path Between Servers In A Coordinated Timing Network," filed Oct. 22, 2007; U.S. Provisional Ser. No. 60/887,586 entitled "Facilitating Recovery In A Coordinated Timing Network," filed Jan. 31, 2007; U.S. Ser. No. 11/876,323 entitled "Facilitating Recovery In A Coordinated Timing Network," filed Oct. 22, 2007; U.S. Provisional Ser. No. 60/887,544 entitled "Channel Subsystem Server Time Protocol Commands," filed Jan. 31, 2007; U.S. Ser. No. 11/876,796 entitled "Channel Subsystem Server Time Protocol Commands And System Therefor," filed Oct. 23, 2007; U.S. Provisional Ser. No. 60/887,512 entitled "Server Time Protocol Messages And Methods," filed Jan. 31, 2007; U.S. Ser. No. 11/940,518 entitled "Server Time Protocol Messages And Methods," filed Nov. 15, 2007; U.S. Ser. No. 11/468,352, entitled "Coordinated Timing Network Configuration Parameter Update Procedure," filed Aug. 30, 2006; U.S. Ser. No. 11/460,025, entitled "Directly Obtaining By Application Programs Information Usable In Determining Clock Accuracy," filed Jul. 26, 2006; U.S. Ser. No. 11/223,886, entitled "System And Method For TOD-Clock Steering," filed Sep. 9, 2005; U.S. Ser. No. 11/532,168, entitled "Synchronization Signal For TOD-Clock Steering Adjustment," filed Sep. 15, 2006; U.S. Ser. No. 11/468,501, entitled "Managing Data Access Via A Loop Only If Changed Locking Facility," filed Aug. 30, 2006; U.S. Ser. No. 11/223,878, entitled Clock Filter Dispersion," filed Sep. 9, 2005; U.S. Ser. No. 11/223,876, entitled "Method And System For Clock Skew And Offset Estimation," filed Sep. 9, 2005; U.S. Ser. No. 11/223,577, entitled "Use Of T4 Timestamps To Calculate Clock Offset And Skew," filed Sep. 9, 2005; and U.S. Ser. No. 11/223,642 entitled "System And Method For Calibrating A TOD Clock," filed Sep. 9, 2005.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Moreover, although various control blocks have been described, each of these control blocks can include additional, less and/or different information. The location within the control block and the size of each field within the control block can vary for different embodiments.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A computer program product for facilitating recover in a timing network, the computer program product comprising:
   a tangible storage medium readable by a processor and storing instructions for execution by the processor for performing a method comprising:
   detecting, by one server of the timing network, a communication failure situation in the timing network for which corrective action is to be taken, said communication failure situation excluding a failure of the one server and another server of the timing network coupled to the one server;
   obtaining, in response to the detecting the communication failure situation, status information of the another server of the timing network, said status information comprising a stratum level of the another server and a
level of capability of the another server; and
selecting a corrective action to be taken, said selecting
being based on the communication failure situation,
the obtained status information, and a stratum level
and a level of capability of the one server.

2. The computer program product of claim 1, wherein in performing the selected corrective action at least part of the timing network remains in timing synchronization.

3. The computer program product of claim 1, wherein the selected corrective action maintains data integrity within the timing network.

4. The computer program product of claim 1, wherein the level of capability of the one server comprises at least one version of a timing protocol associated with the one server, the level of capability of the another server comprises at least one version of a timing protocol associated with the another server, and wherein the level of capability of the one server is different from the level of capability of the another server.

5. The computer program product of claim 4, wherein the level of capability includes aspects related to Server Time Protocol timing, including at least one of recovery, configuration, timing management, formatting of time synchronization messages and time of day clock synchronization.

6. The computer program product of claim 1, wherein the communication failure situation comprises one of:
the one server and the another server being at a stratum-0 level; or
the one server and the another server being at a stratum-1 level.

7. The computer program product of claim 1, wherein the detecting comprises:
requesting, by the one server, operational status of the another server, said requesting including a request that comprises the stratum level and the level of capability of the one server;
attempting, by a console coupled to the one server, to communicate with a console of the another server;
forwarding, in response to a successful attempt, the stratum level and the level of capability of the one server to a console of the another server;
determining, by the console of the another server, whether the another server is in a failed state; and
wherein the obtaining the status information is performed in response to determining that the another server is not in the failed state.

8. The computer program product of claim 7, wherein the obtaining comprises:
requesting by the console of the another server exchange of server state;
providing, by the console of the another server to the console of the one server, the stratum level and level of capability of the one server and the another server; and
forwarding, from the console of the one server to the one server, the stratum level and the level of capability of the one server and the another server.

9. The computer program product of claim 8, wherein the selecting is performed by the one server or the another server depending on the communication failure situation and the stratum level and level of capability of the one server and the another server.

10. The computer program product of claim 1, wherein the detecting comprises:
determining that a system check signal has been issued;
deciding whether the system check signal can be interpreted as a failure of the another server of the timing network; and
invoking a console assisted recovery procedure to determine the communication failure situation, in response to deciding that the system check signal cannot be interpreted as a failure of the another server.

11. A method of facilitating recovery in a timing network, said method comprising:
detecting, by one server of the timing network, a communication failure situation in the timing network for which corrective action is to be taken, said communication failure situation excluding a failure of the one server and another server of the timing network coupled to the one server;
obtaining, in response to the detecting the communication failure situation, status information of the another server of the timing network, said status information comprising a stratum level of the another server and a level of capability of the another server; and
selecting a corrective action to be taken, said selecting being based on the communication failure situation, the obtained status information, and a stratum level and a level of capability of the one server.

12. The method of claim 11, wherein the detecting comprises:
requesting, by the one server, operational status of the another server, said requesting including a request that comprises the stratum level and the level of capability of the one server;
attempting, by a console coupled to the one server, to communicate with a console of the another server;
forwarding, in response to a successful attempt, the stratum level and the level of capability of the one server to a console of the another server;
determining, by the console of the another server, whether the another server is in a failed state; and
wherein the obtaining the status information is performed in response to determining that the another server is not in the failed state.

13. The method of claim 12, wherein the obtaining comprises:
requesting by the console of the another server exchange of server state;
providing, by the console of the another server to the console of the one server, the stratum level and level of capability of the one server and the another server; and
forwarding, from the console of the one server to the one server, the stratum level and the level of capability of the one server and the another server.

14. The method of claim 11, wherein the detecting comprises:
determining that a system check signal has been issued;
deciding whether the system check signal can be interpreted as a failure of the another server of the timing network; and
invoking a console assisted recovery procedure to determine the communication failure situation, in response to deciding that the system check signal cannot be interpreted as a failure of the another server.

15. A computer system for facilitating recovery in a timing network, said computer system comprising:
a memory; and
a processor in communications with the memory, wherein the computer system is configured to perform a method, said method comprising:
detecting, by one server of the timing network, a communication failure situation in the timing network for which corrective action is to be taken, said communication failure situation excluding a failure of the one server and another server of the timing network coupled to the one server;

obtaining, in response to the detecting the communication failure situation, status information of the another server of the timing network, said status information comprising a stratum level of the another server and a level of capability of the another server; and selecting a corrective action to be taken, said selecting being based on the communication failure situation, the obtained status information, and a stratum level and a level of capability of the one server.

16. The computer system of claim 15, wherein the level of capability includes aspects related to Server Time Protocol timing, including at least one of recovery, configuration, timing management, formatting of time synchronization messages and time of day clock synchronization.

17. The computer system of claim 15, wherein the detecting comprises:

requesting, by the one server, operational status of the another server, said requesting including a request comprising the stratum level and the level of capability of the one server;

attempting, by a console coupled to the one server, to communicate with a console of the another server;

forwarding, in response to a successful attempt, the stratum level and the level of capability of the one server to a console of the another server;

determining, by the console of the another server, whether the another server is in a failed state; and wherein the obtaining the status information is performed in response to determining that the another server is not in the failed state.

18. The computer system of claim 17, wherein the obtaining comprises:

requesting by the console of the another server exchange of server state;

providing, by the console of the another server to the console of the one server, the stratum level and level of capability of the one server and the another server; and forwarding, from the console of the one server to the one server, the stratum level and the level of capability of the one server and the another server.

19. The computer program product of claim 1, wherein the timing network comprises a timing network link between the one server and the another server, and wherein the communication failure situation comprises a loss in timing network link communication.

20. The computer program product of claim 19, wherein the timing network further comprises a console communication path, separate from the timing network link, coupling the one server and the another server and allowing the one server and the another server to communicate across the console communication path, and wherein the obtaining is via the console communication path.

* * * * *